US012565980B2

(12) United States Patent
Saito et al.

(10) Patent No.: US 12,565,980 B2
(45) Date of Patent: Mar. 3, 2026

(54) ILLUMINATION DEVICE

(71) Applicant: Japan Display Inc., Tokyo (JP)

(72) Inventors: Hitoshi Saito, Tokyo (JP); Gang Shao, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/056,389

(22) Filed: Feb. 18, 2025

(65) Prior Publication Data

US 2025/0189102 A1 Jun. 12, 2025

Related U.S. Application Data

(63) Continuation of application No. PCT/JP2023/028018, filed on Jul. 31, 2023.

(30) Foreign Application Priority Data

Sep. 1, 2022 (JP) ................................ 2022-139366

(51) Int. Cl.
*F21V 14/00* (2018.01)

(52) U.S. Cl.
CPC .................................. *F21V 14/003* (2013.01)

(58) Field of Classification Search
CPC ..................................................... F21V 14/003
See application file for complete search history.

(56) References Cited

U.S. PATENT DOCUMENTS

| | | | | |
|---|---|---|---|---|
| 12,366,344 B2 * | 7/2025 | Takahata | .................. | F21S 2/00 |
| 2013/0321385 A1 | 12/2013 | Fujisawa | | |
| 2024/0319527 A1 * | 9/2024 | Imai | .................. | G02F 1/133531 |
| 2024/0381509 A1 * | 11/2024 | Yamaguchi | ............ | H05B 47/10 |
| 2024/0389209 A1 * | 11/2024 | Yamaguchi | ............... | F21V 9/40 |
| 2025/0189101 A1 * | 6/2025 | Chien | .................... | H05B 47/19 |

FOREIGN PATENT DOCUMENTS

| | | | | |
|---|---|---|---|---|
| JP | H02-065001 A | 3/1990 | | |
| JP | 2008270089 A * | 11/2008 | ............. | H05B 47/19 |
| WO | WO-2012074056 A1 * | 6/2012 | ............. | G09G 32/16 |

OTHER PUBLICATIONS

Search Report issued in International Patent Application No. PCT/JP2023/028018, mailed on Sep. 26, 2023 and English translation of same. 5 pages.

* cited by examiner

*Primary Examiner* — Christopher E Dunay
(74) *Attorney, Agent, or Firm* — K&L Gates LLP

(57) ABSTRACT

An illumination device includes: a light source part emitting light; a light distribution shape setter setting a light distribution shape of light from the light source part; a storage storing therein light distribution shape data related to the light distribution shape; and a controller controlling the light distribution shape setter based on the light distribution shape data. Further, the light distribution shape setter sets the light distribution shape based on a signal level input from the controller, and when changing the signal level input to the light distribution shape setter from a first level to a second level, the controller changes the signal level from the first level to a third level that is a level between the first level and the second level, and changes the signal level from the third level to the second level after maintaining the third level for a predetermined time period.

5 Claims, 29 Drawing Sheets

FIG.29

Dz

| | | | |
|---|---|---|---|
| FOURTH LIQUID CRYSTAL CELL | SECOND SUBSTRATE | p | s |
| | LIQUID CRYSTAL LAYER | ↑ | ↑ |
| | FIRST SUBSTRATE | s DIFFUSION | p |
| THIRD LIQUID CRYSTAL CELL | SECOND SUBSTRATE | s | p |
| | LIQUID CRYSTAL LAYER | ↑ | ↑ |
| | FIRST SUBSTRATE | p | s DIFFUSION |
| SECOND LIQUID CRYSTAL CELL | SECOND SUBSTRATE | p | s DIFFUSION |
| | LIQUID CRYSTAL LAYER | ↑ | ↑ |
| | FIRST SUBSTRATE | s | p |
| FIRST LIQUID CRYSTAL CELL | SECOND SUBSTRATE | s DIFFUSION | p |
| | LIQUID CRYSTAL LAYER | ↑ | ↑ |
| | FIRST SUBSTRATE | p | s |

| | | |
|---|---|---|
| LIGHT SOURCE | p | s |

ILLUMINATION DEVICE

CROSS-REFERENCE TO RELATED APPLICATION

This application claims the benefit of priority from Japanese Patent Application No. 2022-139366 filed on Sep. 1, 2022 and International Patent Application No. PCT/JP2023/028018 filed on Jul. 31, 2023, the entire contents of which are incorporated herein by reference.

BACKGROUND

1. Technical Field

The present disclosure relates to an illumination device.

2. Description of the Related Art

In a related-art illumination instrument, a light source such as a light emitting diode (LED) is combined with a thin lens provided with a prism pattern, and the distance between the light source and the thin lens is changed to change a light distribution angle. For example, Japanese Patent Publication No. H02-65001 discloses an illumination instrument in which the front of a transparent light bulb is covered by a liquid crystal light adjustment element, and the transmittance of a liquid crystal layer is changed to switch between directly reaching light and scattering light.

By using the liquid crystal light adjustment element, it is possible to instantaneously change the light distribution shape, but control only with this instantaneous change potentially lacks presentation effectiveness and limits its applications.

SUMMARY

There is a need for providing an illumination device that can add variation to change in the light distribution shape of light.

According to an aspect, an illumination device includes: a light source part to emit light; a light distribution shape setter to set a light distribution shape of light from the light source part; a storage to store therein light distribution shape data related to the light distribution shape; and a controller to control the light distribution shape setter based on the light distribution shape data. Further, the light distribution shape setter sets the light distribution shape based on a signal level input from the controller, and when changing the signal level input to the light distribution shape setter from a first level to a second level, the controller changes the signal level from the first level to a third level that is a level between the first level and the second level, and changes the signal level from the third level to the second level after maintaining the third level for a predetermined time period.

BRIEF DESCRIPTION OF THE DRAWINGS

FIG. 29 is a conceptual diagram for description of light shape change through the optical element according to the embodiment;

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

First Embodiment

Figure 1:
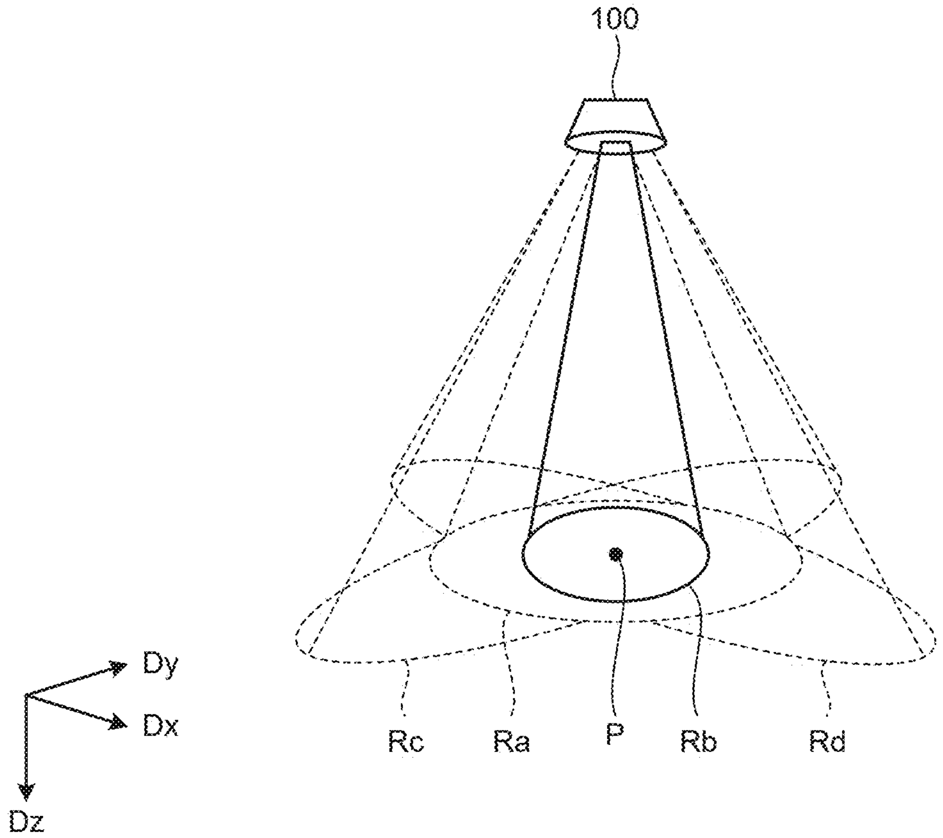
FIG. 1 is a diagram illustrating an exemplary light distribution shape of light from an illumination device according to a first embodiment.

FIG. 1 is a diagram illustrating an exemplary light distribution shape of light from an illumination device according to a first embodiment. In FIG. 1, this illumination device 100 is provided on the ceiling of a room, for example. The illumination device 100 emits light toward the floor of the room, for example. The illumination device 100 includes four liquid crystal cells as described later. A light distribution shape Ra can be achieved through operation of the four liquid crystal cells of the illumination device 100. Light distribution shapes Ra and Rb are circular. The circle of the light distribution shape Ra and the circle of the light distribution shape Rb share the same central point P. The circle of the light distribution shape Ra is larger than the circle of the light distribution shape Rb. The light distribution shapes Ra and Rb can be achieved by emitting light substantially directly downward from the illumination device 100.

In addition, a light distribution shape Rc and a light distribution shape Rd can be achieved through operation of the four liquid crystal cells of the illumination device 100. The light distribution shapes Rc and Rd are elliptical. The ellipse of the light distribution shape Rc and the ellipse of the light distribution shape Rd share the same central point P. The longitudinal direction of the light distribution shape Rc and the longitudinal direction of the light distribution shape Rd are orthogonal to each other. In this manner, in the present embodiment, by controlling operation of an optical element part, it is possible to concentrically enlarge the light distribution shape of an illumination device with respect to the original light distribution shape, as well as set the light distribution shape to an elliptical shape that is long in a Dx direction and an elliptical shape that is long in a Dy direction. The Dx direction and the Dy direction are orthogonal to each other. A Dz direction orthogonal to the Dx direction and the Dy direction is the direction from the illumination device 100 toward the central point P in this application. In the following description, control of the light distribution shape in the Dx direction may be referred to as control of lateral diffusion. In addition, control of the light distribution shape in the Dy direction may be referred to as control of longitudinal diffusion. The size of lateral diffusion can be numerically indicated as a lateral diffusion degree, and in the present embodiment, the lateral diffusion degree is set in the range of 0 to 255. Specifically, when the lateral diffusion degree is 0, there is no diffusion in the lateral direction, light emitted from a light source is emitted as it is without diffusion at the optical element part or the like. When the lateral diffusion degree is 255, light emitted from the light source is diffused to the maximum extent at the optical element part. This is the same in the longitudinal diffusion, and in the present embodiment, a longitudinal diffusion degree is numerically indicated in the range of 0 to 255.

Comparative Example of Change of Light Distribution Shape

For the purpose of understanding the present disclosure, a comparative example of change of the light distribution shape of light will be described below.

Figure 2:
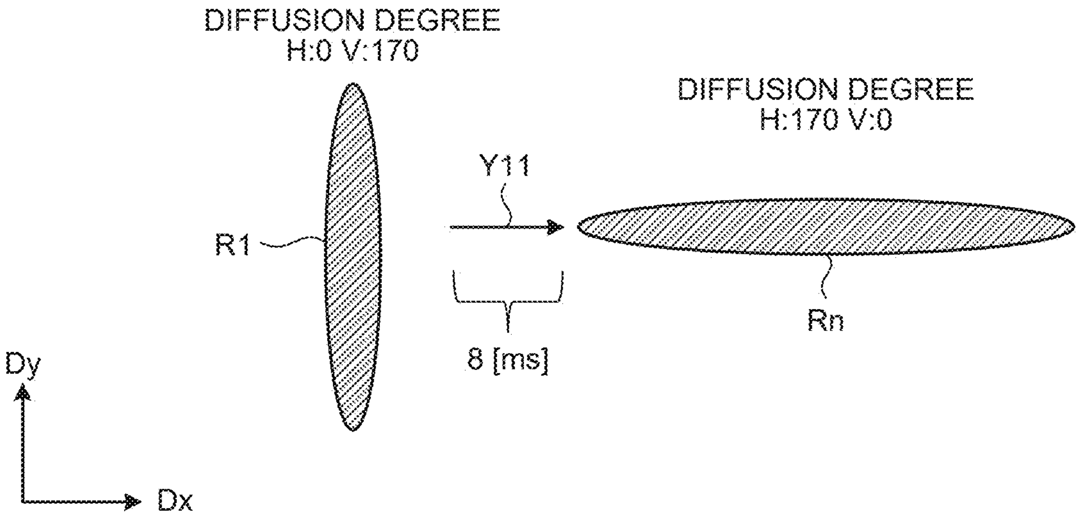
FIG. 2 is a diagram illustrating a comparative example of change of the light distribution shape of light from the illumination device.

FIG. 2 is a diagram illustrating a comparative example of change of the light distribution shape of light from an illumination device. FIG. 2 illustrates an example in which a light distribution shape R1 of light emitted from the illumination device changes to a light distribution shape Rn. In FIG. 2, for the light distribution shape of light, H represents the diffusion degree in the lateral direction (hereinafter referred to as lateral diffusion degree) and V represents the diffusion degree in the longitudinal direction (hereinafter referred to as longitudinal diffusion degree). Each hatched part in FIG. 2 represents the light distribution shape of light. The lateral direction and the longitudinal direction are orthogonal to each other. This is the same in the following description.

The light distribution shape R1 illustrated in FIG. 2 is a shape that is long in the longitudinal direction, in other words, a longitudinally long shape. Thus, as for the diffusion degree of the light distribution shape R1, for example, the lateral diffusion degree H is "0" and the longitudinal diffusion degree V is "170". The light distribution shape Rn is a shape that is long in the lateral direction, in other words, a laterally long shape. Thus, as for the diffusion degree of the light distribution shape Rn, for example, the lateral diffusion degree H is "170" and the longitudinal diffusion degree V is "0". Accordingly, the longitudinal direction of the light distribution shape R1 and the longitudinal direction of the light distribution shape Rn are orthogonal to each other.

Consider a case where the light distribution shape R1 that is a longitudinally long shape changes to the light distribution shape Rn that is a laterally long shape as illustrated with arrow Y11 in FIG. 2. The change to the light distribution shape Rn occurs 8 (ms) after the time point of the light distribution shape R1. In this manner, it appears to the human eyes as if the light distribution shape instantaneously changes. In the illumination device according to the comparative example, the light distribution shape instantaneously changes as described above, but depending on usage of the illumination device, it may be desired to enhance presentation effectiveness not only with such instantaneous change of the light distribution shape but also with gradual or slow change from a light distribution shape to another light distribution shape.

Change of Light Distribution Shape According to Embodiment

Figure 3:
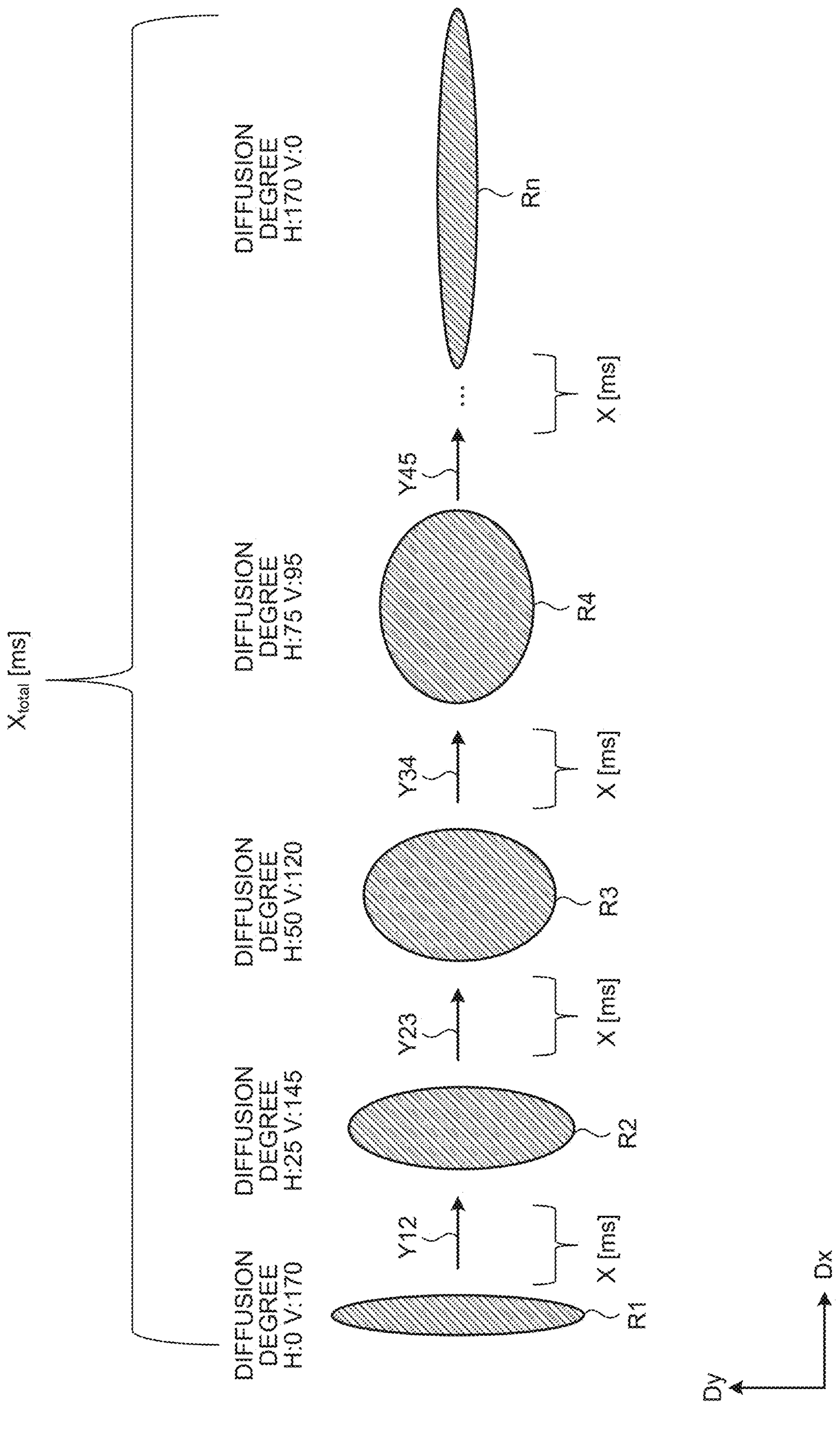
FIG. 3 is a diagram illustrating an example of change of the light distribution shape of light from the illumination device according to the first embodiment.

FIG. 3 is a diagram illustrating an example of change of the light distribution shape of light from the illumination device according to the first embodiment. Each hatched part in FIG. 3 represents the light distribution shape of light. In FIG. 3, for the light distribution shape R1, the lateral diffusion degree H is "0" and the longitudinal diffusion degree V is "170" as in the case of FIG. 2. For the light distribution shape Rn, the lateral diffusion degree H is "170" and the longitudinal diffusion degree V is "0". In the present example, unlike the comparative example, light distribution shapes R2, R3, R4, . . . are inserted halfway through change from the light distribution shape R1 to the light distribution shape Rn. For example, for the light distribution shape R2 that is inserted halfway through the change, the lateral diffusion degree H is "25" and the longitudinal diffusion degree V is "145". Similarly, for the light distribution shape R3, the lateral diffusion degree H is "50" and the longitudinal diffusion degree V is "120". Similarly, for the light distribution shape R4, the lateral diffusion degree H is "75" and the longitudinal diffusion degree V is "95".

In the present example, change from the light distribution shape R1 to the light distribution shape R2 as illustrated with arrow Y12 in FIG. 3 is followed by change from the light distribution shape R2 to the light distribution shape R3 as illustrated with arrow Y23. Thereafter, change from the light distribution shape R3 to the light distribution shape R4 as illustrated with arrow Y34 is followed by change from the light distribution shape R4 to another light distribution shape as illustrated with arrow Y45, likewise in the subsequent period.

A time period until the time point of change from the light distribution shape R1 to the light distribution shape R2 is X (ms), a time period until the time point of change from the light distribution shape R2 to the light distribution shape R3 is X (ms), a time period until the time point of change from the light distribution shape R3 to the light distribution shape R4 is X (ms), and likewise in the subsequent period, a time period until the time point of change to another light distribution shape is X (ms). In other words, change to another light distribution shape is made in each constant time period X (ms).

Thus, the time interval of shape change of the light distribution shape (hereinafter referred to as a shape change interval) is X (ms). The shape change interval is, for example, 100 (ms). In the case of change from the light distribution shape R1 to the light distribution shape Rn, a time period $X_{total}$ (ms) of change from the light distribution shape R1 to the light distribution shape Rn is an integral multiple of X (ms). In a case where the light distribution shape changes six times from the light distribution shape R1 to the light distribution shape Rn, $X_{total}$ (ms) is six times X (ms).

Figure 4:
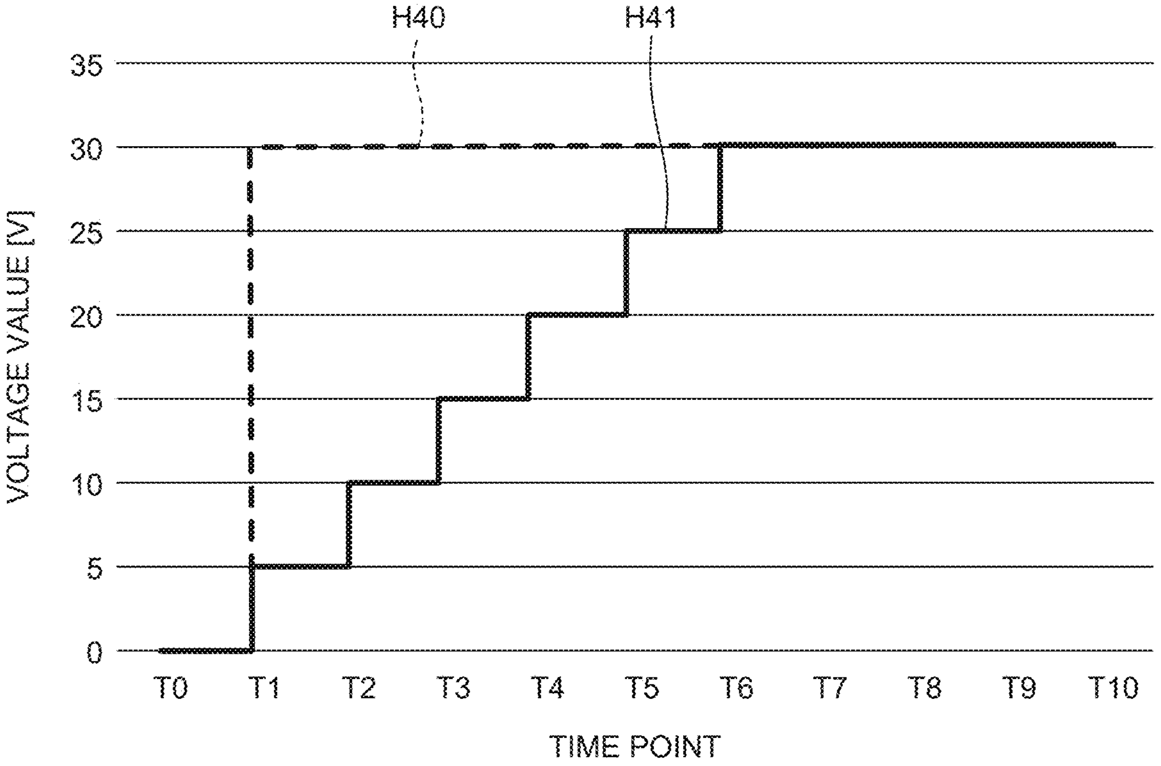
FIG. 4 is a diagram illustrating an example of change in a voltage value applied to each liquid crystal cell over time.

To change the light distribution shape, signal levels, specifically, voltage values applied to liquid crystal cells of the optical element part are changed as described later. FIG. 4 is a diagram illustrating an example of change in the voltage value applied to each liquid crystal cell over time. In FIG. 4, the horizontal axis represents the time point, and the vertical axis represents the voltage value (V). Dashed line H40 illustrated in FIG. 4 indicates an example of voltage change in the case of the comparative example described above with reference to FIG. 2. As illustrated in FIG. 4, according to dashed line H40, the voltage value increases from 0 (V) to 30 (V) at time point T1. Thereafter, the voltage value is maintained at 30 (V) without increase. In the case of the comparative example, it appears to the human eyes as if the light distribution shape instantaneously changes.

Solid line H41 illustrated in FIG. 4 indicates an example of change in the voltage value in the case of an illumination device 1 according to the first embodiment of the present disclosure. As illustrated in FIG. 4, the voltage value is changed as described below according to solid line H41. Specifically, the voltage value is increased from 0 (V) to 5 (V) at time point T1, and thereafter, the voltage value is maintained at 5 (V) without increase between time points T1 and T2. Subsequently, the voltage value is increased from 5 (V) to 10 (V) at time point T2, and thereafter, the voltage value is maintained at 10 (V) without increase between time points T2 and T3. In this case, when the voltage value is changed from a first level (0 (V)) to a second level (10 (V)), the voltage value is changed from the first level to a third level (5 (V)) that is a level between the first level and the second level, maintained at the third level for a predetermined time period (from time point T1 to time point T2), and then changed from the third level to the second level.

Likewise in the subsequent period, in a case of change from a first level to a second level, the voltage value is changed from the first level to a third level that is a level between the first level and the second level, maintained at the third level for a predetermined time period, and then changed from the third level to the second level. At time point T3, the voltage value is increased from 10 (V) to 15 (V), and thereafter, the voltage value is maintained at 15 (V) without increase between time points T3 and T4. At time point T4, the voltage value is increased from 15 (V) to 20 (V), and thereafter, the voltage value is maintained at 20 (V) without increase between time points T4 and T5. At time point T5, the voltage value is increased from 20 (V) to 25 (V), and thereafter, the voltage value is maintained at 25 (V) without increase between time points T5 and T6. At time point T6, the voltage value is increased from 25 (V) to 30 (V), and thereafter, the voltage value is maintained at 30 (V) without increase. The voltage value in the case of the illumination device 1 according to the first embodiment of the present disclosure is increased six times in a stepped manner like solid line H41. In this manner, in a case of change from a first level to a second level, the voltage value is changed from the first level to a third level that is a level between the first level and the second level, maintained at the third level for a predetermined time period, and then changed from the third level to the second level. Thus, the light distribution shape can be gradually changed and it appears to the human eyes as if the light distribution shape gradually changes. Accordingly, it feels as if the light distribution shape naturally changes.

In the illumination device according to the present disclosure, as illustrated in FIG. 4, the signal level, in other words, the voltage value input to each liquid crystal cell of the optical element part is changed a plurality of times to perform shape change a plurality of times. The amount of each shape change is fixed in the first embodiment described later. Accordingly, in the first embodiment described later, shape change is performed in the same amount a plurality of times. However, in a second embodiment described later, the amount of each shape change can be changed.

The above description with reference to FIG. 4 is made on a case where the signal level, in other words, the voltage value is increased. In a case where the signal level, in other words, the voltage value is decreased, the voltage value is decreased in a stepped manner unlike FIG. 4.

Illumination Device According to First Embodiment

Figure 5:
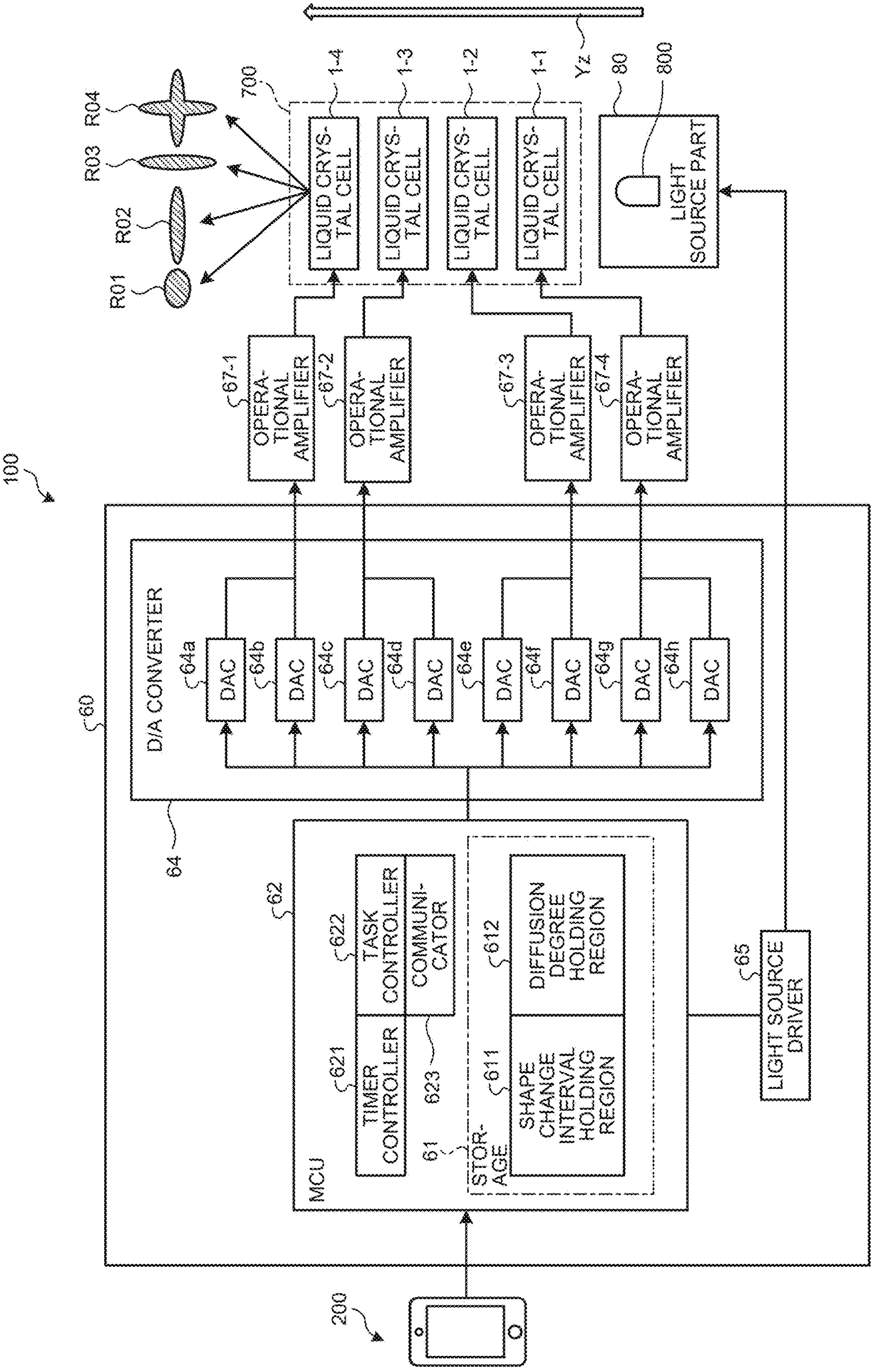
FIG. 5 is a block diagram illustrating a functional configuration of the illumination device according to the first embodiment of the present disclosure.

FIG. 5 is a block diagram illustrating a functional configuration of the illumination device 100 according to the first embodiment of the present disclosure. In FIG. 5, the illumination device 100 according to the first embodiment includes a light source part 80, an optical element part 700, and a controller 60. The light source part 80 includes a light source 800. The light source 800 is, for example, an LED. The light source part 80 emits light in the direction of arrow Yz. The optical element part 700 includes a plurality of liquid crystal cells 1-1 to 1-4.

The illumination device 100 can control the light distribution shape of light from the light source 800 of the light source part 80 by using the optical element part 700. The optical element part 700 functions as a light distribution shape setter configured to set the light distribution shape of light from the light source 800. The optical element part 700 includes a liquid crystal cell for p-wave polarization and a liquid crystal cell for s-wave polarization. A detailed configuration of the liquid crystal cells included in the optical element part 700 will be described later.

The controller 60 includes a micro controller unit (MCU) 62, a digital/analog (D/A) converter 64, and a light source driver 65. The MCU 62 includes a storage 61, a timer controller 621, a task controller 622, and a communicator 623.

The MCU 62 can read various kinds of data from the storage 61. The storage 61 stores therein various kinds of data. The storage contents of the storage 61 will be described later. The MCU 62 outputs various signals to the D/A converter 64 and the light source driver 65. The MCU 62 controls each component of the illumination device 100.

The timer controller 621 manages time points and time periods related to operation of the illumination device 100. The task controller 622 performs calculation related to the light distribution shape of the illumination device 100, calculation of light distribution and adjustment values, and the like. The communicator 623 performs signal communication with each component in the illumination device 100. In addition, the communicator 623 receives an update signal S1 transmitted from a terminal device 200 such as a smartphone. As described later, when setting contents are updated through an operation of the terminal device 200 that is an external device of the illumination device 100, the update signal S1 is transmitted from the terminal device 200 and received by the communicator 623. The contents of the update signal S1 received by the communicator 623 are stored in the storage 61.

The D/A converter 64 outputs, based on a digital signal that is a signal from the MCU 62, an analog signal for operating the liquid crystal cells 1-1 to 1-4 included in the optical element part 700. The D/A converter 64 includes a plurality of digital-to-analog converter (DAC) circuits. Hereinafter, a DAC circuit is simply referred to as "DAC". In the present example, the D/A converter 64 includes eight DACs 64*a* to 64*h*. The DACs 64*a* to 64*h* each convert an input digital signal into an analog signal.

The DACs 64*a* and 64*b* correspond to an operational amplifier 67-1. The DACs 64*a* and 64*b* convert a digital signal output from the MCU 62 into an analog signal. The DACs 64*a* and 64*b* output an analog signal to be input to the operational amplifier 67-1. The digital signal may be converted into an analog signal by the DACs 64*a* and 64*b* as in the present example or by one DAC.

The DACs 64*c* and 64*d* correspond to an operational amplifier 67-2. The DACs 64*c* and 64*d* convert a digital signal output from the MCU 62 into an analog signal. The DACs 64*c* and 64*d* output an analog signal to be input to the operational amplifier 67-2. The digital signal may be converted into an analog signal by the DACs 64*c* and 64*d* as in the present example or by one DAC.

The DACs 64*e* and 64*f* correspond to an operational amplifier 67-3. The DACs 64*e* and 64*f* convert a digital signal output from the MCU 62 into an analog signal. The DACs 64*e* and 64*f* output an analog signal to be input to the operational amplifier 67-3. The digital signal may be converted into an analog signal by the DACs 64*e* and 64*f* as in the present example or by one DAC.

The DACs 64*g* and 64*h* correspond to an operational amplifier 67-4. The DACs 64*g* and 64*h* convert a digital signal output from the MCU 62 into an analog signal. The DACs 64*g* and 64*h* output an analog signal to be input to the operational amplifier 67-4. The digital signal may be converted into an analog signal by the DACs 64*g* and 64*h* as in the present example or by one DAC.

The light source driver 65 is a controller that performs, under control by the MCU 62, ON/OFF control of the light source 800 included in the light source part 80 and light emission intensity control when the light source 800 is ON. The controller may be one circuit or may include a plurality of circuits.

The operational amplifiers 67-1, 67-2, 67-3, and 67-4 correspond to the liquid crystal cells 1-1, 1-2, 1-3, and 1-4, respectively. The operational amplifiers 67-1, 67-2, 67-3, and 67-4 receive inputting of analog signals output from the D/A converter 64. The operational amplifiers 67-1, 67-2, 67-3, and 67-4 apply the analog signals to the corresponding liquid crystal cells 1-1, 1-2, 1-3, and 1-4. The operational amplifiers 67-1, 67-2, 67-3, and 67-4 maintain the voltage levels of the analog signals provided to the corresponding liquid crystal cells 1-1, 1-2, 1-3, and 1-4.

The storage 61 of the illumination device 100 according to the first embodiment includes a shape change interval holding region 611 and a diffusion degree holding region 612. The shape change interval holding region 611 stores therein the value of the shape change interval. The diffusion degree holding region 612 stores therein the values of the diffusion degrees.

The illumination device 100 according to the first embodiment illustrated in FIG. 5 can set the light distribution shape of light from the light source part 80 by controlling the signal level, in other words, the voltage value input to the optical element part 700. For example, light distribution shapes R01, R02, R03, and R04 can be achieved. The light distribution shape R01 is an elliptical light distribution shape. The light distribution shape R02 is a laterally long light distribution shape. The light distribution shape R03 is a longitudinally long light distribution shape. The light distribution shape R04 is a cross light distribution shape formed by combining a laterally long light distribution shape and a longitudinally long light distribution shape.

Operation of Illumination Device According to First Embodiment

Figure 6:
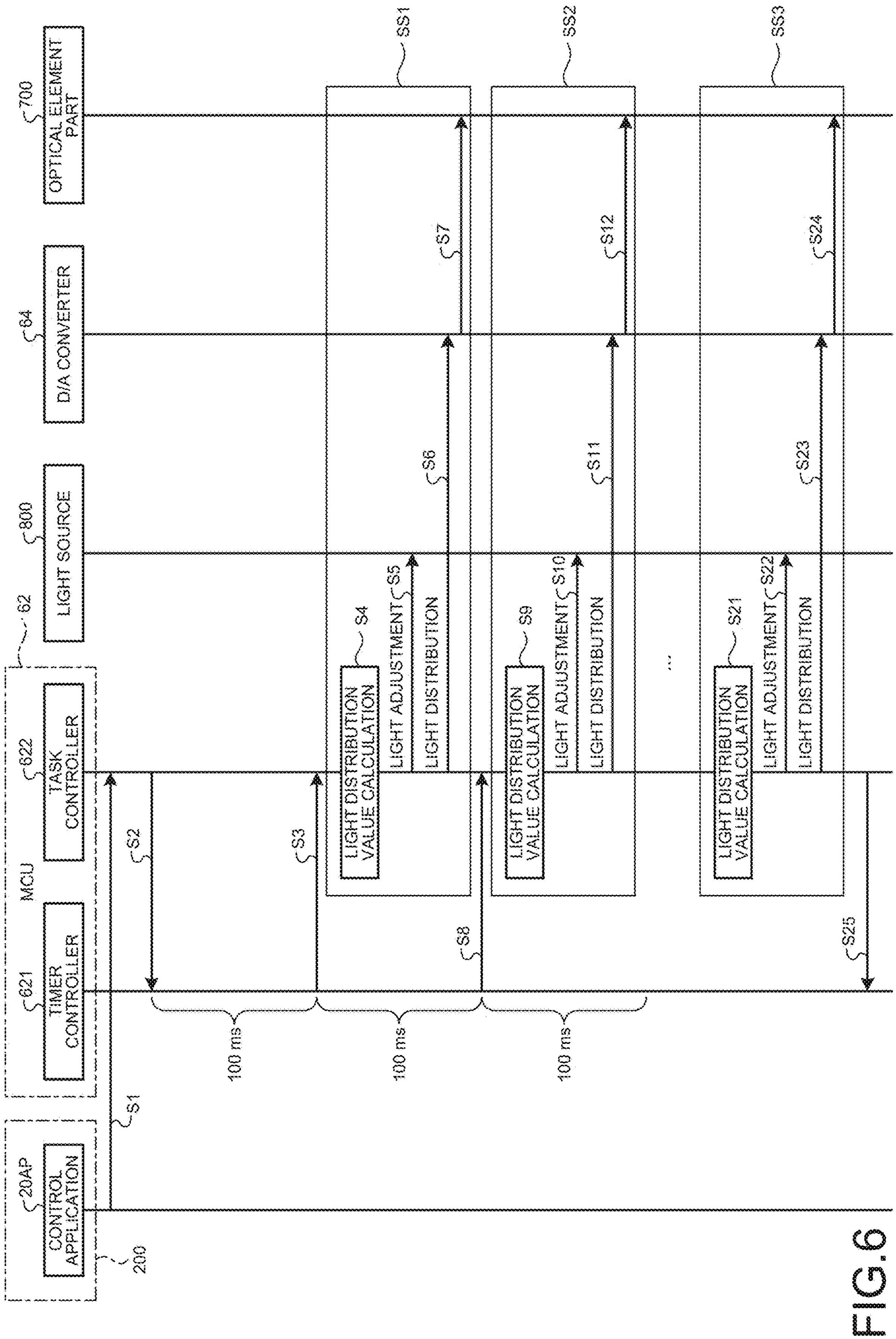
FIG. 6 is a time chart for description of signal communication among components of the illumination device according to the first embodiment.

FIG. 6 is a time chart for description of signal communication among components of the illumination device 100 according to the first embodiment. FIG. 6 illustrates signal communication among the terminal device 200 such as a smartphone, the MCU 62, the light source 800, the D/A converter 64, and the optical element part 700. Signal communication by the timer controller 621 and the task controller 622 is illustrated for the MCU 62. Illustrations of the operational amplifiers in FIG. 5 are omitted in FIG. 6.

In FIG. 6, a setting content, in other words, a target value is transmitted as an update signal (S1) upon an operation on a control application 20AP of the terminal device 200. Having received the update signal (S1), the task controller 622 of the MCU 62 of the illumination device 100 outputs a timer activation signal (S2). Having received the timer activation signal (S2), the timer controller 621 sets a timer value. The initial timer value is, for example, 100 (ms). The timer controller 621 outputs a timer-out signal each time the set timer value elapses.

When the set timer value elapses, the timer controller 621 outputs the timer-out signal (S3). Having received the timer-out signal (S3), the task controller 622 calculates light distribution values (S4). The task controller 622 outputs a light adjustment signal (S5) to the light source 800. In the present example, the light adjustment values and the light distribution values are independently controlled. The task controller 622 outputs the light adjustment values set on the terminal device 200 as the light adjustment signal. Likewise in the subsequent period, the light adjustment values set on the terminal device 200 are output as the light adjustment signal.

The task controller 622 also outputs a light distribution signal (S6) that is a digital signal. The light distribution signal (S6) is converted into a light distribution signal (S7) that is an analog signal by the D/A converter 64. The light distribution signal (S7) is input to the optical element part 700 and light distribution control with the liquid crystal cells of the optical element part 700 is performed.

Hereinafter, a series of processes involving the calculation (S4) of light distribution values, the outputting of the light adjustment signal (S5), and the outputting of the light distribution signal (S6) by the task controller 622, and the conversion into the light distribution signal (S7) by the D/A converter 64 is referred to as processing SS1. The task controller 622 performs the same processing as the processing SS1 upon each reception of the timer-out signal.

Specifically, when the set timer value elapses, the timer controller 621 outputs a timer-out signal (S8) and sequential processing SS2 involving calculation (S9) of light distribution values by the task controller 622, outputting of a light adjustment signal (S10), outputting of a light distribution signal (S11), and conversion into a light distribution signal (S12) by the D/A converter 64 is performed.

Thereafter, in the same manner, when the timer controller 621 outputs the timer-out signal, a series of processes involving the calculation of light distribution and adjustment values, the outputting of a light adjustment signal, and the outputting of a light distribution signal by the task controller 622, and the conversion into a light distribution signal by the D/A converter 64 is performed.

In the present embodiment, the voltage value changes six times as described above with reference to FIG. 4. Accordingly, after processing SS3 involving calculation (S21) of light distribution values, outputting of a light adjustment signal (S22), outputting of a light distribution signal (S23), and conversion into a light distribution signal (S24) by the D/A converter 64, the task controller 622 outputs a timer stop signal (S25). With this signal, the timer controller 621 stops outputting of the timer-out signal.

Figure 7:
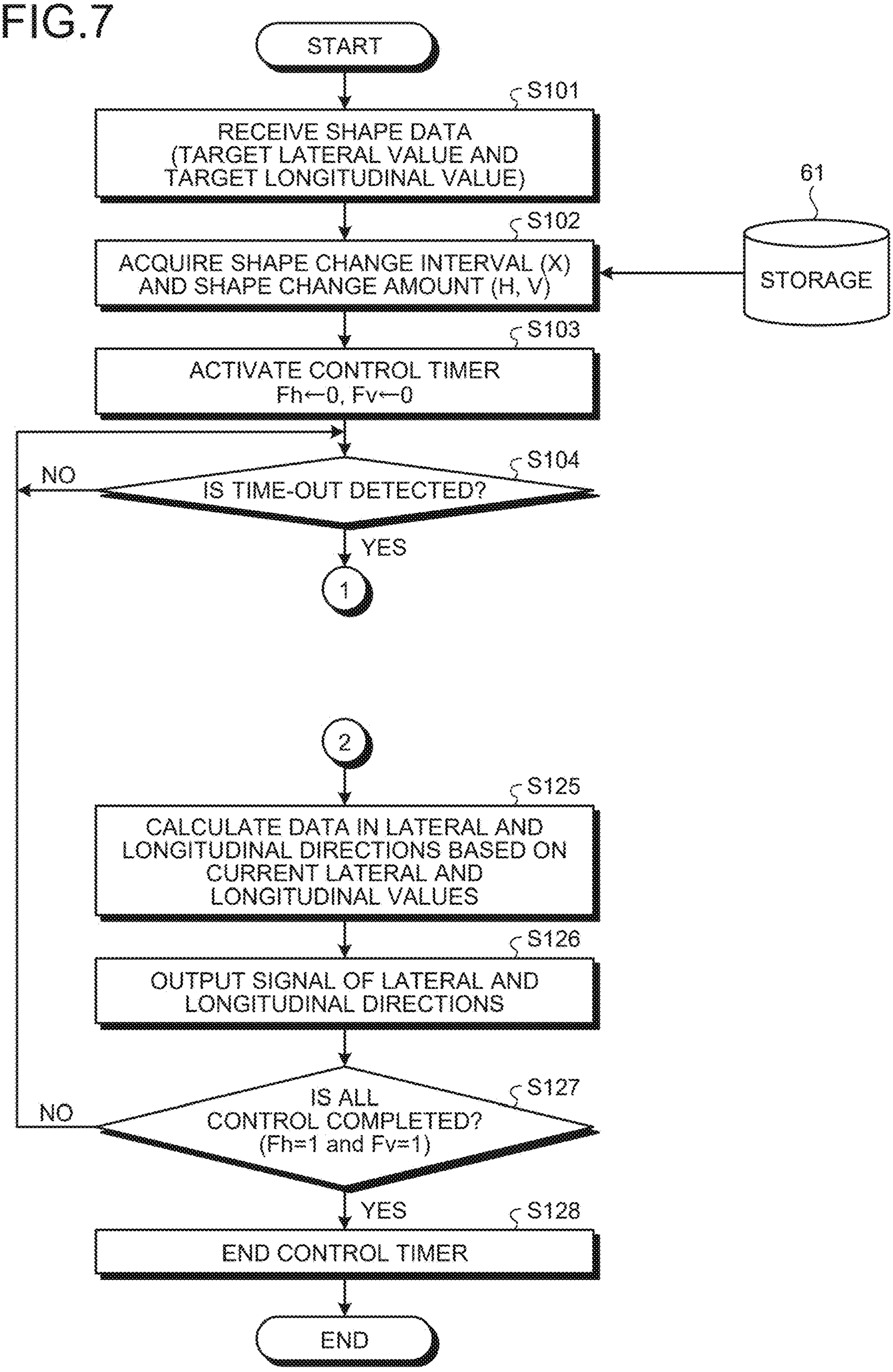
FIG. 7 is a flowchart illustrating operation of the illumination device according to the first embodiment.
Figure 8:
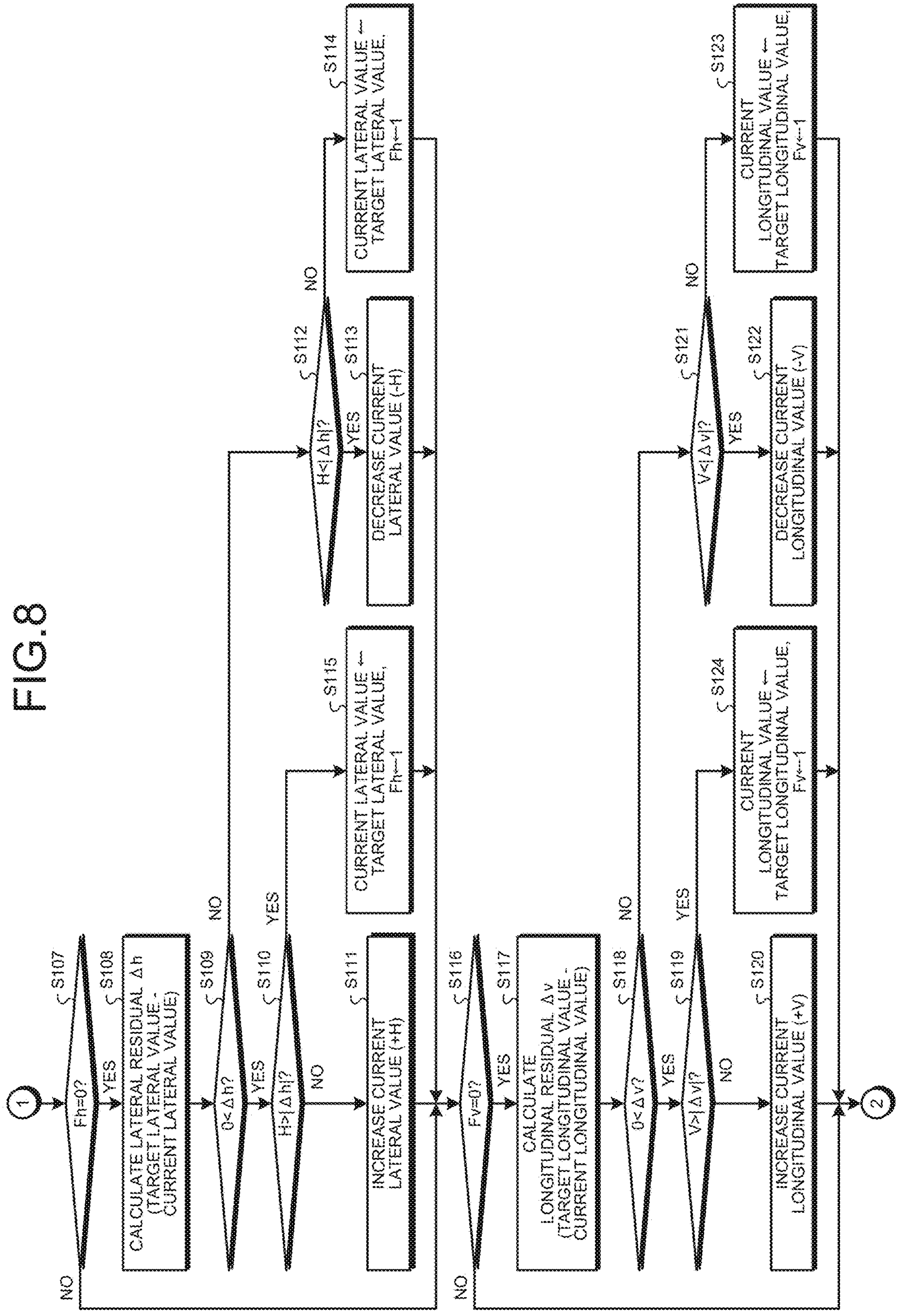
FIG. 8 is a flowchart illustrating operation of the illumination device according to the first embodiment.

FIGS. 7 and 8 are flowcharts illustrating operation of the illumination device according to the first embodiment. FIGS. 7 and 8 mainly illustrate operation of the MCU 62. Transition from FIG. 7 to FIG. 8 is represented by circled number (1). Transition from FIG. 8 to FIG. 7 is represented by circled number (2). The following describes a case where the current light distribution shape with the lateral diffusion degree H of 0 and the longitudinal diffusion degree V of 170 is changed to a light distribution shape with the lateral diffusion degree H of 170 and the longitudinal diffusion degree V of 0 upon a user operation. In the following description, the lateral diffusion degree and the longitudinal diffusion degree are collectively denoted by the diffusion degree (H:0, V:170), for example, in some cases. Description will be made of a case where a shape change amount is added to the current value to approach a target lateral value or a target longitudinal value. In a case where the target value is smaller than the current value, the shape change amount is subtracted from the current value to approach the target lateral value or the target longitudinal value.

In FIG. 7, first, when a user changes the diffusion degree from (H:0, V:170) of the current state to (H:170, V:0) through an operation on a screen of the terminal device 200, the terminal device 200 transmits the diffusion degree (shape data) after the operation to an illumination device 100 as the update signal S1. A specific screen operation by the user in this case will be described later. The value of the diffusion degree after the operation is the target value (the target lateral value or the target longitudinal value). The task controller 622 of the MCU 62 of the illumination device 100 receives the shape data (target lateral value (H:170) and target longitudinal value (V:0)) from the terminal device 200 (step S101). In addition, the task controller 622 acquires the shape change interval (X) (in the present example, 100 ms) and the shape change amount (H, V) (in the present example, +25) from the storage 61 (step S102).

Subsequently, the task controller 622 activates the timer controller 621 (step S103). The timer controller 621 activates a control timer based on the shape change interval (X). The task controller 622 uses a lateral change completion flag Fh and a longitudinal change completion flag Fv indicating whether the processing is complete or incomplete for change in the lateral direction and change in the longitudinal direction. When the control timer is activated, the task controller 622 sets to the lateral change completion flag Fh to “0” (incomplete) and sets the longitudinal change completion flag Fv to “0” (incomplete).

Thereafter, the process waits until the timer controller 621 detects time-out (No at step S104). When the timer controller 621 detects time-out (in other words, a predetermined shape change interval (for example, 100 ms) has elapsed), the process transitions to FIG. 8 (Yes at step S104). In FIG. 8, the task controller 622 determines whether the lateral change completion flag Fh is “0” (incomplete) (step S107).

As a result of the determination at step S107, in a case where the lateral change completion flag Fh is “0” (Yes at step S107), the task controller 622 calculates a lateral residual Δh (step S108). Specifically, the task controller 622 calculates the difference between the target lateral value and a current lateral value. The current lateral value refers to the current value of the light distribution shape in the lateral direction, which changes with each shape change interval. In addition, the task controller 622 determines whether the value of the lateral residual Δh calculated at step S108 is larger than zero (step S109). As a result of the determination at step S109, in a case where the value of the lateral residual Δh is larger than zero, in other words, in a case where the light distribution shape is to be scaled up toward the target lateral value (Yes at step S109), the task controller 622 determines whether the absolute value of the lateral residual Δh is smaller than the lateral diffusion degree H that is the shape change amount in the lateral direction (step S110). Specifically, it is determined whether the absolute value of the lateral residual Δh is smaller than the lateral diffusion degree H of “25”. In a case where the absolute value of the lateral residual Δh is not smaller than the lateral diffusion degree H (is equal to or larger than the lateral diffusion degree H) (No at step S110), the lateral diffusion degree H is added to the current lateral value to approach the target lateral value (step S111).

At step S110, in a case where the absolute value of the lateral residual Δh is smaller than the lateral diffusion degree H (Yes at step S110), it is impossible to approach the target lateral value by using only the lateral diffusion degree H. Thus, the task controller 622 only adds the lateral residual Δh to the current lateral value so that the current lateral value becomes equal to the target lateral value, and then sets the lateral change completion flag Fh to "1" (step S115).

At step S109, in a case where the value of the lateral residual Δh is not larger than zero (is equal to or smaller than zero), in other words, in a case where the light distribution shape is to be scaled down toward the target lateral value (No at step S109), the task controller 622 determines whether the absolute value of the lateral residual Δh is larger than the lateral diffusion degree H (step S112). At step S112, in a case where the absolute value of the lateral residual Δh is larger than H (Yes at step S112), the task controller 622 subtracts the lateral diffusion degree H from the current lateral value to approach the target lateral value (step S113).

At step S112, in a case where the absolute value of the lateral residual Δh is not larger than the lateral diffusion degree H (is equal to or smaller than the lateral diffusion degree H) (No at step S112), it is impossible to approach the target lateral value by using only the lateral diffusion degree H. Thus, the task controller 622 subtracts only the lateral residual Δh from the current lateral value so that the current lateral value becomes equal to the target lateral value, and then sets the lateral change completion flag Fh to "1" (step S114).

After step S111, S113, S114, or S115, the process transitions to step S116. Similarly, as a result of the determination at step S107, in a case where the lateral change completion flag Fh is "1" (No at step S107), the process transitions to step S116. The task controller 622 determines whether the longitudinal change completion flag Fv is "0" (incomplete) (step S116). As a result of the determination at step S116, in a case where the longitudinal change completion flag Fv is "0" (Yes at step S116), the task controller 622 calculates a longitudinal residual Δv (step S117). Specifically, the task controller 622 calculates the difference between the target longitudinal value and a current longitudinal value. The current longitudinal value refers to the current value of the light distribution shape in the longitudinal direction, which changes with each shape change interval.

The task controller 622 determines whether the value of the longitudinal residual Δv calculated at step S117 is larger than zero (step S118). As a result of the determination at step S118, in a case where the value of the longitudinal residual Δv is larger than zero, in other words, in a case where the light distribution shape is to be scaled up toward the target longitudinal value (Yes at step S118), the task controller 622 determines whether the absolute value of the longitudinal residual Δv is smaller than the longitudinal diffusion degree V that is the shape change amount in the longitudinal direction (step S119). Specifically, it is determined whether the absolute value of the longitudinal residual Δv is smaller than the longitudinal diffusion degree V of "25". In a case where the absolute value of the longitudinal residual Δv is not smaller than the longitudinal diffusion degree V in the longitudinal direction (is equal to or larger than the longitudinal diffusion degree V) (No at step S119), the longitudinal diffusion degree V is added to the current longitudinal value to approach the target longitudinal value (step S120).

At step S119, in a case where the absolute value of the longitudinal residual Δv is smaller than the longitudinal diffusion degree V (Yes at step S119), it is impossible to approach the target longitudinal value by using only the longitudinal diffusion degree V in the longitudinal direction. Thus, the task controller 622 only adds the longitudinal residual Δv to the current longitudinal value so that the current longitudinal value becomes equal to the target longitudinal value, and then sets the longitudinal change completion flag Fv to "1" (step S124).

At step S118, in a case where the value of the longitudinal residual Δv is not larger than zero (is equal to or smaller than zero), in other words, in a case where the light distribution shape is to be scaled down toward the target longitudinal value (No at step S118), the task controller 622 determines whether the absolute value of the longitudinal residual Δv is larger than the longitudinal diffusion degree V (step S121). At step S121, in a case where the absolute value of the longitudinal residual Δv is larger than the longitudinal diffusion degree V (Yes at step S121), the task controller 622 subtracts the longitudinal diffusion degree V from the current longitudinal value to approach the target longitudinal value (step S122).

At step S121, in a case where the absolute value of the longitudinal residual Δv is not larger than the longitudinal diffusion degree V (is equal to or smaller than the longitudinal diffusion degree V) (No at step S121), it is impossible to approach the target longitudinal value by using only the longitudinal diffusion degree V. Thus, the task controller 622 subtracts only the longitudinal residual Δv from the current longitudinal value so that the current longitudinal value becomes equal to the target longitudinal value, and then sets the longitudinal change completion flag Fv to "1" (step S123). After step S120, S122, S123, or S124, the process returns to FIG. 7 and transitions to step S125. Similarly, as a result of the determination at step S116, in a case where the longitudinal change completion flag Fv is "1" (No at step S116), the process returns to FIG. 7 and transitions to step S125.

In FIG. 7, the task controller 622 calculates data in the lateral direction and the longitudinal direction based on the current lateral value and the current longitudinal value (step S125). The task controller 622 outputs, toward the D/A converter 64, a digital signal corresponding to the data in the lateral direction and the longitudinal direction (step S126).

Subsequently, the task controller 622 determines whether all the control is completed (step S127). Specifically, it is determined whether the lateral change completion flag Fh is "1" and the longitudinal change completion flag Fv is "1".

As a result of the determination at step S127, in a case where the lateral change completion flag Fh is not "1" or in a case where the longitudinal change completion flag Fv is not "1" (No at step S127), the task controller 622 returns to step S104 and continues processing.

As a result of the determination at step S127, in a case where the lateral change completion flag Fh is "1" and the longitudinal change completion flag Fv is "1" (Yes at step S127), the task controller 622 ends operation of the control timer of the timer controller 621, which ends the series of processes (step S128).

Setting of Illumination Device According to First Embodiment

The shape change interval and diffusion degree of the light distribution shape may be instructed from the outside of the illumination device 100. For example, application software may be installed on a terminal device such as a smartphone in advance, and the shape change interval and diffusion degree of the light distribution shape may be instructed by activating the application software on the terminal device.

Example of Terminal Setting Screen

Figure 9:
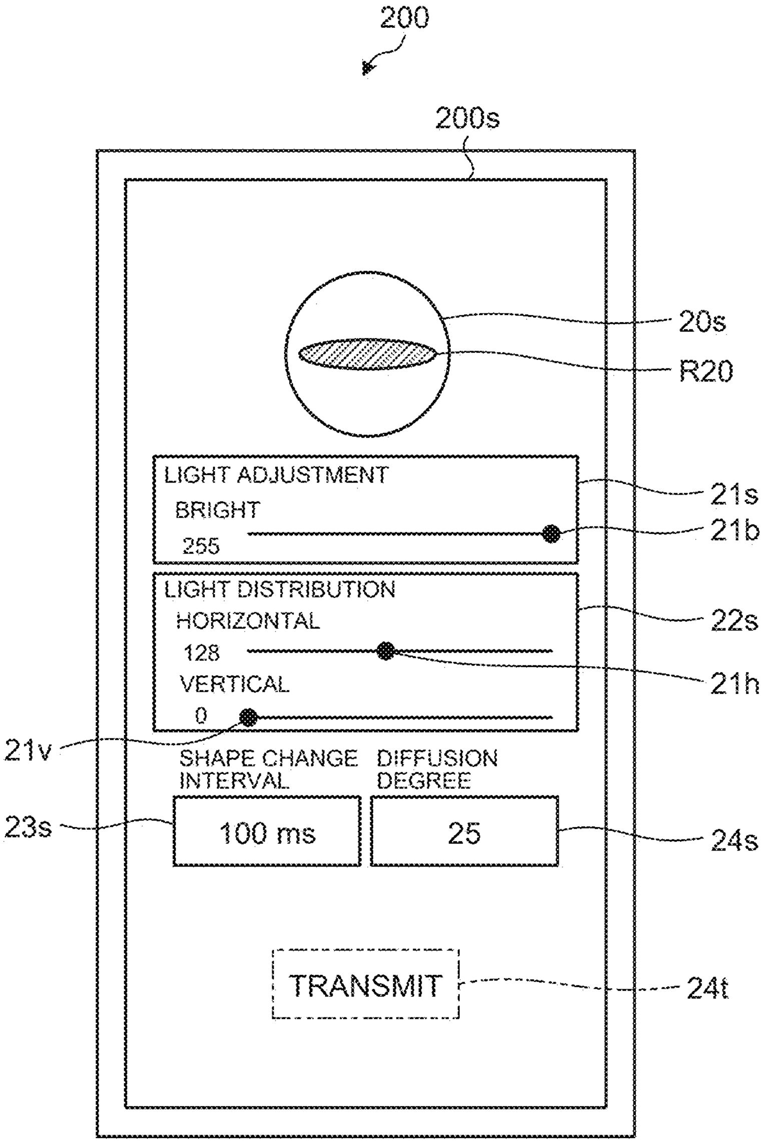
FIG. 9 is a diagram illustrating an example of a screen for setting the illumination device according to the first embodiment.

FIG. 9 is a diagram illustrating an example of a screen for setting the illumination device 100 according to the first embodiment. FIG. 9 illustrates an example of the screen of the terminal device 200 such as a smartphone. FIG. 9 illustrates an example of a screen 200*s* displayed by activating application software through an operation of the terminal device 200. As illustrated in FIG. 9, a light distribution possible range region 20*s* indicating a region in which light can be distributed from the illumination device 100, a light-adjustment adjustment region 21*s*, a light distribution adjustment region 22*s*, a shape change interval setting region 23*s*, and a shape change amount setting region 24*s* are displayed on the screen 200*s* according to the present example.

The light distribution possible range region 20*s* is a region indicating a light distribution shape that is set through an operation of the terminal device 200. A light distribution shape object R20 corresponding to a light distribution shape achieved by settings of the illumination device at that time is displayed in the light distribution possible range region 20*s* in cooperation with a numerical value indicated in a light distribution adjustment region 22 to be described later.

The light-adjustment adjustment region 21*s* is a region indicating a light-adjustment adjustment value that is set through an operation of the terminal device 200. The current setting value of the light-adjustment adjustment value is displayed in the light-adjustment adjustment region 21*s*. In the present example, the current setting value of the light-adjustment adjustment value is "255".

The light distribution adjustment region 22*s* is a region indicating a light distribution adjustment value that is set through an operation of the terminal device 200. The current light distribution shape control state on the illumination device side, in other words, the current values of the lateral and longitudinal diffusion degrees are displayed in the light distribution adjustment region 22*s*. In the present example, the setting value of the light distribution adjustment value in the lateral direction (Horizontal) is "128". The horizontal setting value can be changed by dragging an operation point 21*h* to the right or left in the drawing. In the present example, the setting value of the light distribution adjustment value in the longitudinal direction (Vertical) is "0". The vertical setting value can be changed by dragging an operation point 21*v* to the right or left in the drawing. When the operation points 21*h* and 21*v* are dragged on the terminal device 200 to input the lateral and longitudinal setting values, the terminal device 200 simultaneously sends a changed longitudinal diffusion degree (target value) and a changed lateral diffusion degree (target value) to the illumination device 100.

A method of simultaneously sending the changed longitudinal diffusion degree (target value) and the changed lateral diffusion degree (target value) from the terminal device 200 to the illumination device 100 is, for example, as follows. Specifically, a transmission button 24*t* may be provided on the screen 200*s*, and the changed longitudinal and lateral diffusion degrees (target values) may be simultaneously transmitted when the transmission button is tapped after the setting values are input.

Alternatively, no transmission button 24*t* may be provided, and the changed longitudinal and lateral diffusion degrees (target values) may be simultaneously transmitted when the two operation points 21*h* and 21*v* are simultaneously operated with two fingers and the fingers become separated from the screen 200*s*. Moreover, no transmission button 24*t* may be provided, and the changed longitudinal and lateral diffusion degrees (target values) may be simultaneously transmitted when the shape of the light distribution shape object R20 may be changed through a swipe operation with two fingers and the fingers become separated from the screen 200*s*. The operation points 21*h* and 21*v* preferably move in cooperation with change in the shape of the light distribution shape object R20.

The shape change interval setting region 23*s* is a region indicating the value of a shape change interval that is set through an operation of the terminal device 200. The current setting value of the shape change interval is displayed in the shape change interval setting region 23*s*. The current setting value of the shape change interval is "100 ms". The setting value of the shape change interval can be changed by inputting a numerical value.

The shape change amount setting region 24*s* is a region indicating the value of a shape change amount that is set through an operation of the terminal device 200. The current setting value of the shape change amount is displayed in the shape change amount setting region 24*s*. The current setting value of the shape change amount is "25". Specifically, the setting value indicates that the change amounts of the light distribution shape in the lateral and longitudinal directions are both 25 in the increasing and decreasing directions. The setting value of the shape change amount can be changed by inputting a numerical value.

Settings of the illumination device can be changed and transmitted by operating the above-described light-adjustment adjustment region 21*s*, light distribution adjustment region 22*s*, shape change interval setting region 23*s*, and shape change amount setting region 24*s* through the terminal device 200. The shape change interval setting region 23*s* and the shape change amount setting region 24*s* are provided to change settings of the change amount of shape change and its change interval time, and change in these regions does not change the light distribution shape itself. Thus, these numerical values can be changed at a timing different from the timing of changing the light distribution shape. On the other hand, change of the light distribution adjustment region 22*s* results in change of the light distribution shape itself. Accordingly, the light distribution shape change indicated in FIGS. 7 and 8 described above is started upon change of the numerical value in the light distribution adjustment region 22*s*. Specifically, the terminal device 200 transmits, based on contents that are set through operations in the above-described regions, data related to the shape change interval (X) and the shape change amount (H, V) to the illumination device 100 as the above-described update signal (S1). With this configuration, the user of the illumination device 100 can achieve a desired light distribution shape with the illumination device 100 by using the terminal device 200.

Data Storage in Illumination Device

Figure 10:
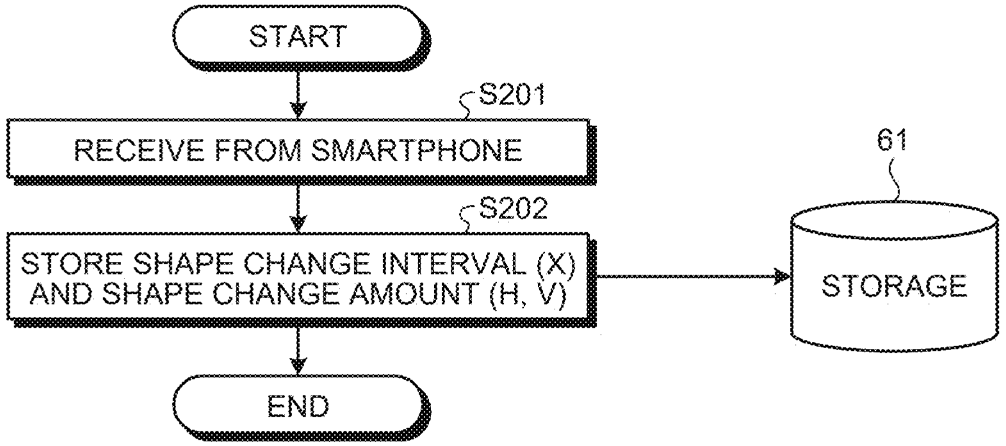
FIG. 10 is a flowchart for description of operation when data for controlling the illumination device is stored by using a terminal device such as a smartphone.

Data (X) related to the shape change interval and data (H, V) related to the shape change amount can be stored in the storage 61 of the MCU 62. FIG. 10 is a flowchart for description of operation when data for controlling the illumination device 100 is stored by using a terminal device such as a smartphone. As illustrated in FIG. 10, the illumination device 100 receives data (X) related to the shape change interval and data (H, V) related to the shape change amount from the terminal device 200 such as a smartphone (step S201). Subsequently, the illumination device 100 stores the received data (X) related to the shape change interval and data (H, V) related to the shape change amount in the storage 61 (step S202). The illumination device 100 operates as described above based on these pieces of data stored in the storage 61.

Figure 11:
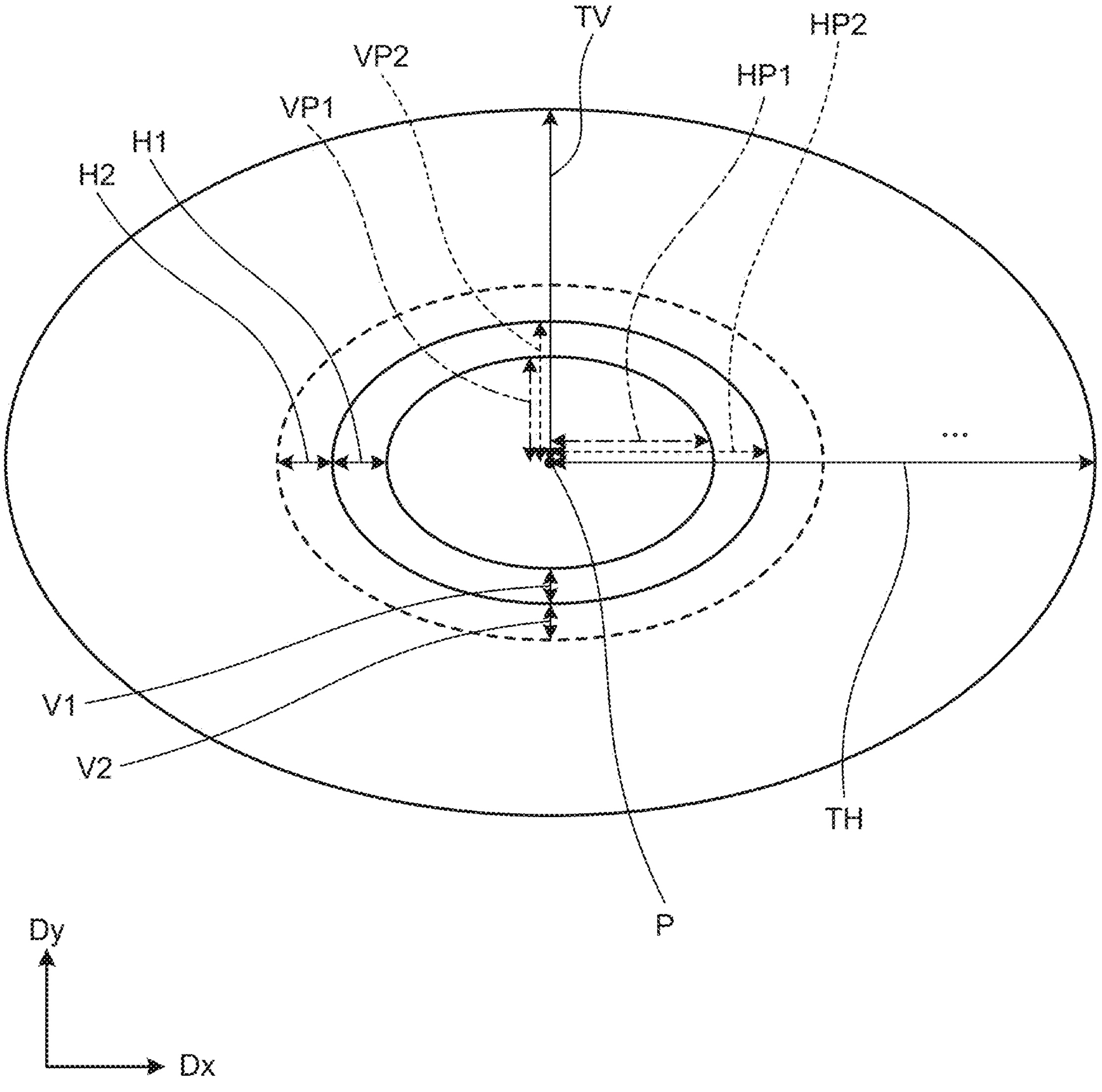
FIG. 11 is a diagram for description of change processing of the light distribution shape in longitudinal and lateral directions by a task controller.

FIG. 11 is a diagram for description of processing of changing the light distribution shapes in the longitudinal and lateral directions by the task controller 622. The task controller 622 adds the shape change amount in each of the longitudinal direction (vertical direction) and the lateral direction (horizontal direction) to approach a target longitudinal value TV and a target lateral value TH. The following describes a case where the shape change amount is added, but the shape change amount may be subtracted to approach the target longitudinal value TV and the target lateral value TH.

In FIG. 11, the current value in the lateral direction with respect to the central point P of the light distribution shape is a current lateral value HP1. To approach the target lateral value TH with the current value, the task controller 622 adds a lateral shape change amount H1 to the current lateral value HP1. Accordingly, the current value changes to a current lateral value HP2. In other words, the current lateral value HP2 becomes a new current value. Thereafter, in the same manner, to approach the target lateral value TH with the current value, the task controller 622 adds a lateral shape change amount H2 to the current lateral value HP2, thereby obtaining a new current value. The task controller 622 repeats the above-described processing.

The current value in the longitudinal direction with respect to the central point P of the light distribution shape is a current longitudinal value VP1. To approach the target longitudinal value TV with the current value, the task controller 622 adds a longitudinal shape change amount V1 to the current longitudinal value VP1. Accordingly, the current value changes to a current longitudinal value VP2. In other words, the current longitudinal value VP2 becomes a new current value. Thereafter, in the same manner, to approach the target longitudinal value TV with the current value, the task controller 622 adds a longitudinal shape change amount V2 to the current longitudinal value VP2, thereby obtaining a new current value. The task controller 622 repeats the above-described processing.

Second Embodiment

Figure 12:
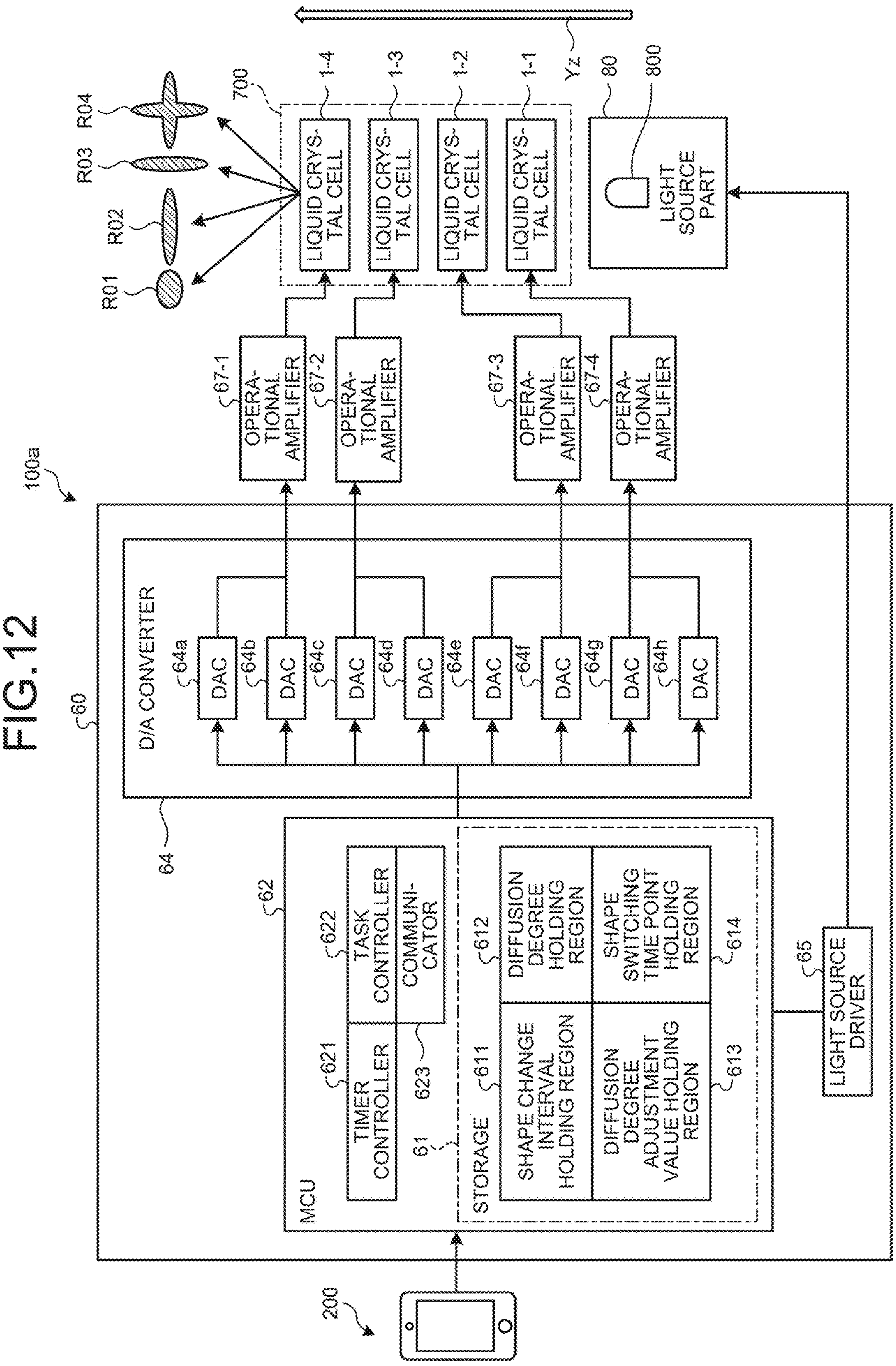
FIG. 12 is a block diagram illustrating a functional configuration of an illumination device according to a second embodiment of the present disclosure.

FIG. 12 is a block diagram illustrating a functional configuration of an illumination device 100*a* according to the second embodiment of the present disclosure. As illustrated in FIG. 12, the illumination device 100*a* according to the second embodiment is different from the illumination device 100 according to the first embodiment in contents of storage in the storage 61. The illumination device 100*a* according to the second embodiment includes a diffusion degree adjustment value holding region 613 and a shape switching time point holding region 614 in addition to the shape change interval holding region 611 and the diffusion degree holding region 612. The diffusion degree adjustment value holding region 613 is a region that stores therein a diffusion degree adjustment value. The diffusion degree adjustment value is a value for adjusting the diffusion degree. The MCU 62 stores the diffusion degree adjustment value received by the communicator 623 from the terminal device 200 in the diffusion degree adjustment value holding region 613. The shape switching time point holding region 614 is a region that stores therein the value of a shape switching time point. The shape switching time point indicates the time point of shape change of the light distribution shape. The MCU 62 stores the value of the shape switching time point received by the communicator 623 from the terminal device 200 in the shape switching time point holding region 614.

Figure 13:
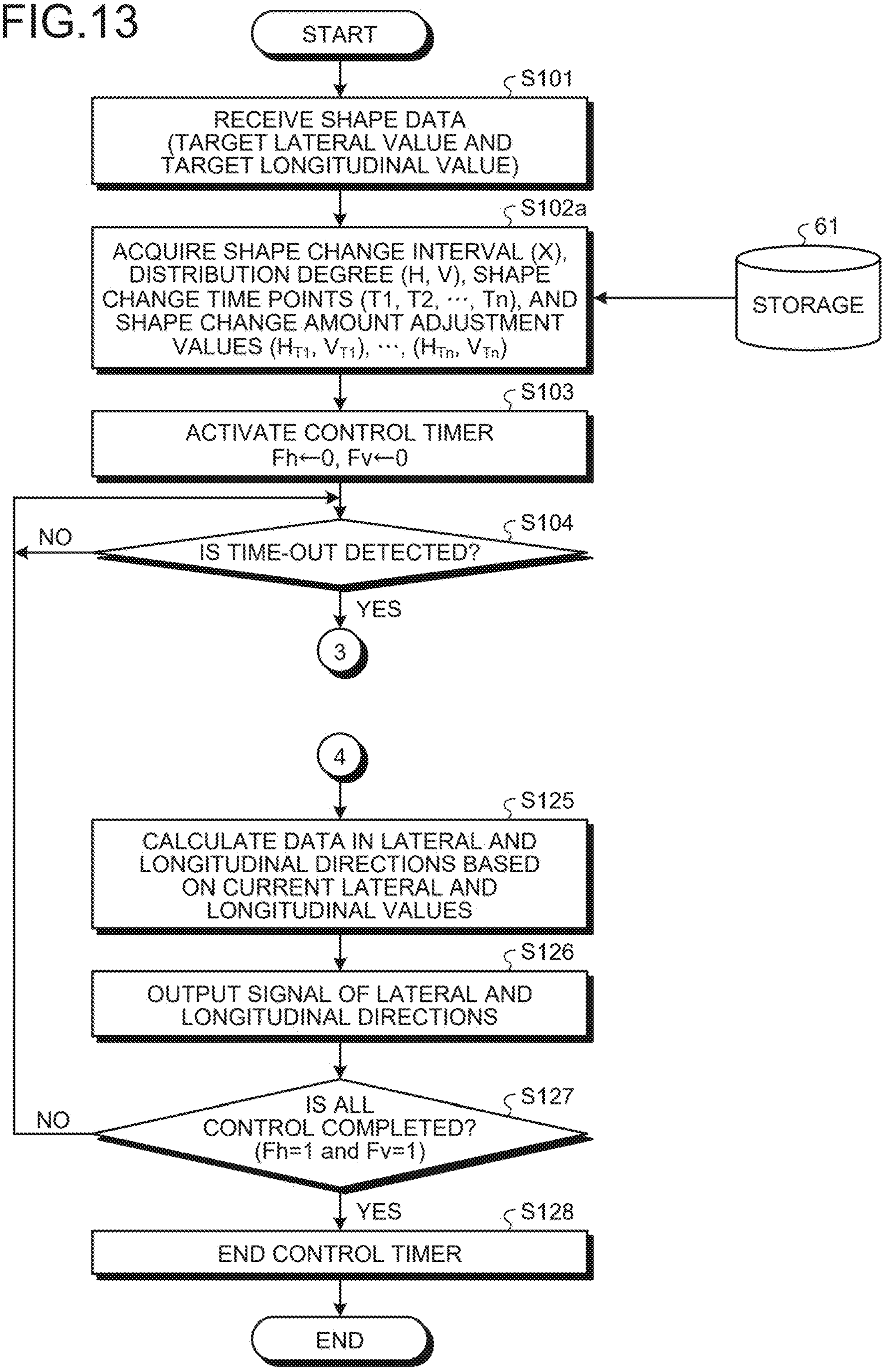
FIG. 13 is a flowchart illustrating operation of the illumination device according to the second embodiment.
Figure 14:
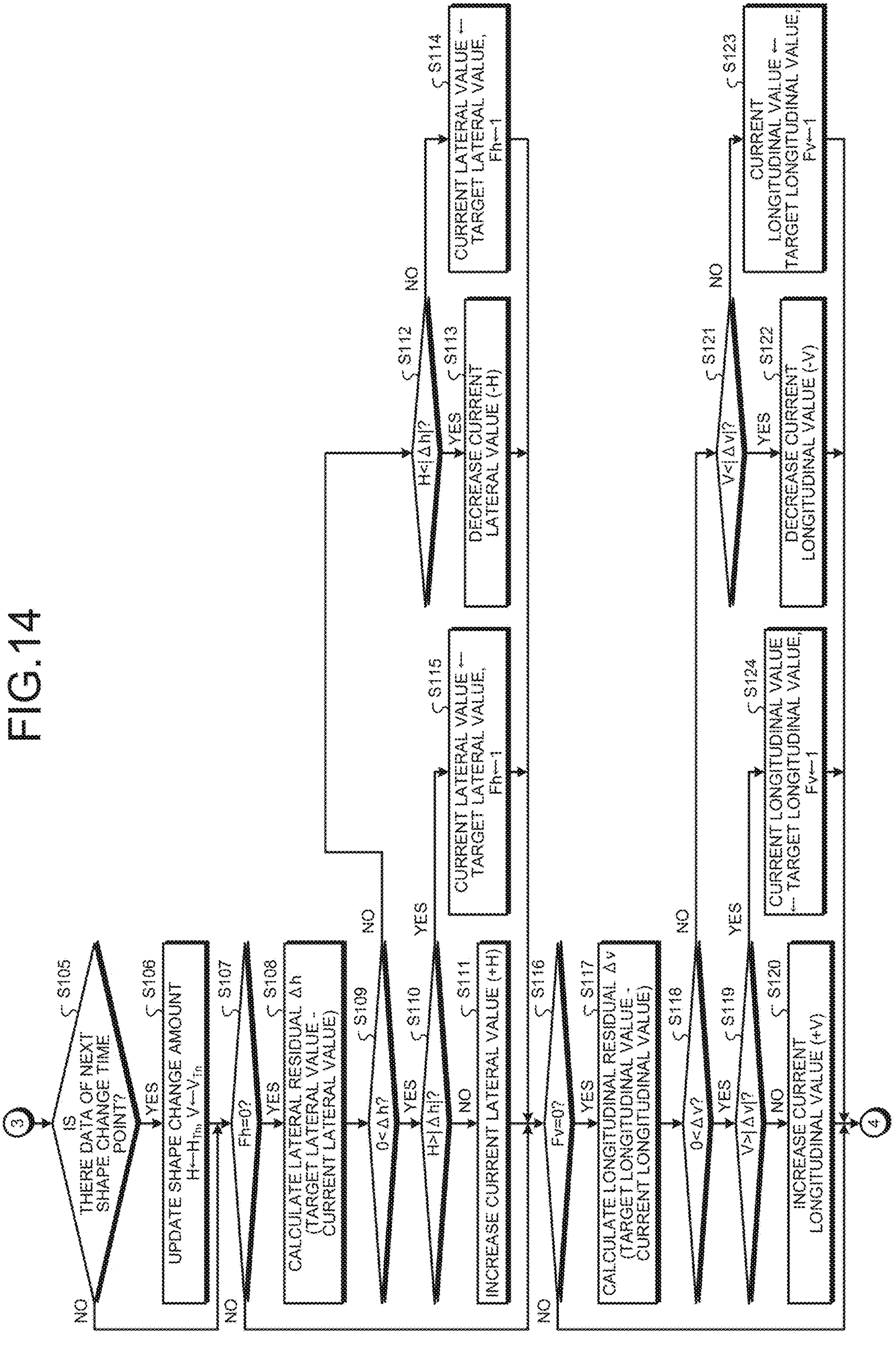
FIG. 14 is a flowchart illustrating operation of the illumination device according to the second embodiment.

FIGS. 13 and 14 are flowcharts illustrating operation of the illumination device 100*a* according to the second embodiment. Transition from FIG. 13 to FIG. 14 is represented by circled number (3). Transition from FIG. 14 to FIG. 13 is represented by circled number (4). Difference in FIGS. 13 and 14 from the processes described above with reference to FIG. 7 among processes of the illumination device 100*a* according to the second embodiment lies in processing at step S102*a* and addition of processing at steps S105 and S106.

In FIG. 13, first, the task controller 622 of the MCU 62 receives shape data (target lateral and longitudinal values) (step S101). The task controller 622 acquires data (T1, T2, . . . , Tn) related to shape change time points and data (($H_{T1}$, $V_{T1}$), . . . , ($H_{Tn}$, $V_{Tn}$)) related to shape change amount adjustment values from the storage 61 in addition to the shape change interval (X) and the shape change amount (H, V) (step S102*a*).

Subsequently, the task controller 622 activates the timer controller 621 (step S103). The timer controller 621 activates the control timer based on the shape change interval (X). In this case, the lateral change completion flag Fh is set to "0" (incomplete) and the longitudinal change completion flag Fv is set to "0" (incomplete).

Thereafter, the process waits until the timer controller 621 detects time-out (No at step S104). When the timer controller 621 detects time-out, the process transitions to FIG. 14 (Yes at step S104). In FIG. 14, the task controller 622 determines whether there is data (T1, T2, . . . , Tn) related to the next shape change time point (step S105).

At step S105, in a case where there is data related to the next shape change time point (Yes at step S105), the process transitions to step S106 and updates the shape change amount (step S106). Specifically, a lateral shape change amount adjustment value HIn is updated as the lateral diffusion degree H that is the shape change amount in the lateral direction, and a longitudinal shape change amount adjustment value VIn is updated as the longitudinal diffusion degree V that is the shape change amount in the longitudinal direction. Thereafter, the process transitions to step S107.

At step S105, in a case where there is no data related to the next shape change time point (No at step S105), the process transitions to step S107. At step S107, the task controller 622 determines whether the lateral change completion flag Fh is "0" (incomplete) (step S107). Subsequent processing is the same as processing described above with reference to FIGS. 7 and 8.

Example of Terminal Setting Screen

Figure 15:
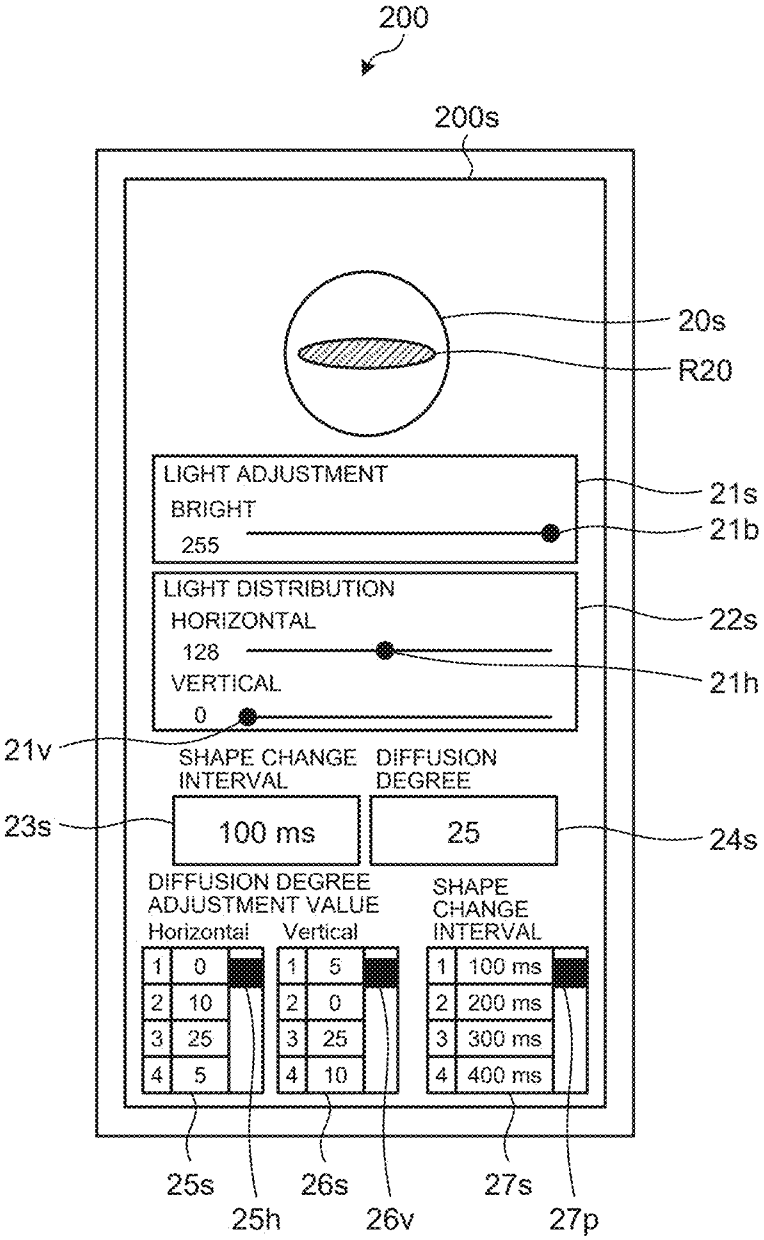
FIG. 15 is a diagram illustrating an example of a screen for setting the illumination device according to the second embodiment.

FIG. 15 is a diagram illustrating an example of a screen for setting the illumination device 100*a* according to the second embodiment. FIG. 15 illustrates an example of the screen of the terminal device 200 such as a smartphone. FIG. 15 illustrates an example of the screen 200*s* displayed by activating application software through an operation of the terminal device 200. In the illumination device 100*a* according to the second embodiment, a lateral shape change amount adjustment value setting region 25*s*, a longitudinal shape change amount adjustment value setting region 26*s*, and a shape change duration setting region 27*s* are displayed in addition to the screen 200*s* according to the first embodiment described above with reference to FIG. 9.

The lateral shape change amount adjustment value setting region 25*s* displays "0", "10", "25", and "5" corresponding to numbers "1", "2", "3", and "4" representing shape change order. The first setting value is "0", the second setting value is "10", the third setting value is "25", and the fourth setting value is "5". Hidden numbers "5", "6", . . . , which are larger than "4", can be displayed by dragging a slider 25*h* downward in the drawing. With this configuration, setting values can be input for the fifth shape change, the sixth shape change, . . . , as well. For example, setting values may be input up to the fiftieth shape change. A number indicating the number of times of shape change can be selected by dragging the slider 25*h* upward or downward in the drawing, which allows for inputting of a setting value corresponding to the selected number.

The longitudinal shape change amount adjustment value setting region 26*s* displays "5", "0", "25", and "10" corresponding to numbers "1", "2", "3", and "4" representing shape change order. The first setting value is "5", the second setting value is "0", the third setting value is "25", and the fourth setting value is "10". Hidden numbers "5", "6", . . . , which are larger than "4", can be displayed by dragging a slider 26*v* downward in the drawing. With this configuration, setting values can be input for the fifth shape change, the sixth shape change, . . . , as well. For example, setting values may be input up to the fiftieth shape change. A number indicating the number of times of shape change can be selected by dragging the slider 26*v* upward or downward in the drawing, which allows for inputting of a setting value corresponding to the selected number.

The shape change duration setting region 27*s* displays "100 ms", "200 ms", "300 ms", and "400 ms" corresponding to numbers "1", "2", "3", and "4" representing shape change order. The first setting value is "100 ms", the second setting value is "200 ms", the third setting value is "300 ms", and the fourth setting value is "400 ms". Hidden numbers "5", "6", . . . which are larger than "4", can be displayed by dragging a slider 27*p* downward in the drawing. With this configuration, setting values can be input for the fifth shape change, the sixth shape change, . . . , as well. For example, setting values may be input up to the fiftieth shape change. A number indicating the number of times of shape change can be selected by dragging the slider 27*p* upward or downward in the drawing, which allows for inputting of a setting value corresponding to the selected number.

In the present example, with the setting regions 25*s*, 26*s*, and 27*s* according to the present example, it is indicated for the first shape change that the lateral change value is "0" ($H_{T1}$=0), the longitudinal change value is "5" ($V_{T1}$=5), and the duration of the first shape change is "100 ms" (TO (shape change start time point)−T1=100 ms). In addition, it is indicated for the second shape change that the lateral change value is "10" ($H_{T2}$=10), the longitudinal change value is "0" ($V_{T2}$=0), and the duration of the second shape change is "200 ms" (T2−T1=200). It is indicated for the third shape change that the lateral change value is "25" ($H_{T3}$=25), the longitudinal change value is "25" ($V_{T3}$=25), and the duration of the third shape change is "300 ms" (T3−T2=300). It is indicated for the fourth shape change that the lateral change value is "5" ($H_{T4}$=5), the longitudinal change value is "10" ($V_{T4}$=10), and its duration is "400 ms" (T4−T3=400).

Settings of the illumination device can be changed by performing inputting to or operations of the above-described light-adjustment adjustment region 21*s*, light distribution adjustment region 22*s*, shape change interval setting region 23*s*, shape change amount setting region 24*s*, lateral shape change amount adjustment value setting region 25*s*, longitudinal shape change amount adjustment value setting region 26*s*, and shape change duration setting region 27*s* through the terminal device 200. The terminal device 200 transmits, based on contents that are set through operations in the above-described regions, the shape change interval (X), the shape change amount (H, V), data (T1, T2, . . . , Tn) related to shape change time points, and data (($H_{T1}$, $V_{T1}$), . . . , ($H_{Tn}$, $V_{Tn}$)) related to shape change amount adjustment values to the illumination device 100*a*. With this configuration, the user of the illumination device 100*a* can achieve a desired light distribution shape with the illumination device 100*a* by using the terminal device 200.

Data Storage in Illumination Device

Figure 16:
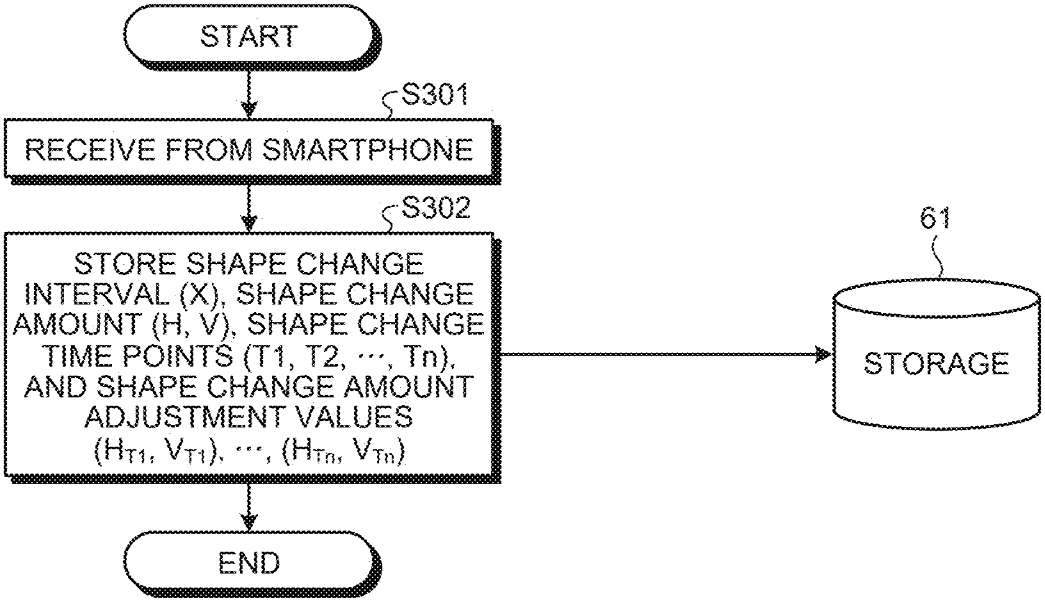
FIG. 16 is a flowchart for description of operation when the illumination device is set by using a terminal device such as a smartphone.

Data (X) related to the shape change interval, data (H, V) related to the shape change amount, data (T1, T2, . . . , Tn) related to shape change time points, and data (($H_{T1}$, $V_{T1}$), . . . , ($H_{Tn}$, $V_{Tn}$)) related to shape change amount adjustment values can be stored in the storage 61 of the MCU 62. FIG. 16 is a flowchart for description of operation when the illumination device 100*a* is set by using a terminal device such as a smartphone. As illustrated in FIG. 16, the illumination device 100*a* receives data (X) related to the shape change interval, data (H, V) related to the shape change amount, data (T1, T2, . . . , Tn) related to shape change time points, and data (($H_{T1}$, $V_{T1}$), . . . , ($H_{Tn}$, $V_{Tn}$)) related to shape change amount adjustment values from the terminal device 200 such as a smartphone (step S301). Subsequently, the illumination device 100*a* stores the received data in the storage 61 (step S302). The illumination device 100*a* operates as described above based on these pieces of data stored in the storage 61.

Exemplary Shape Change of Light Distribution Shape Over Time

Figure 17:
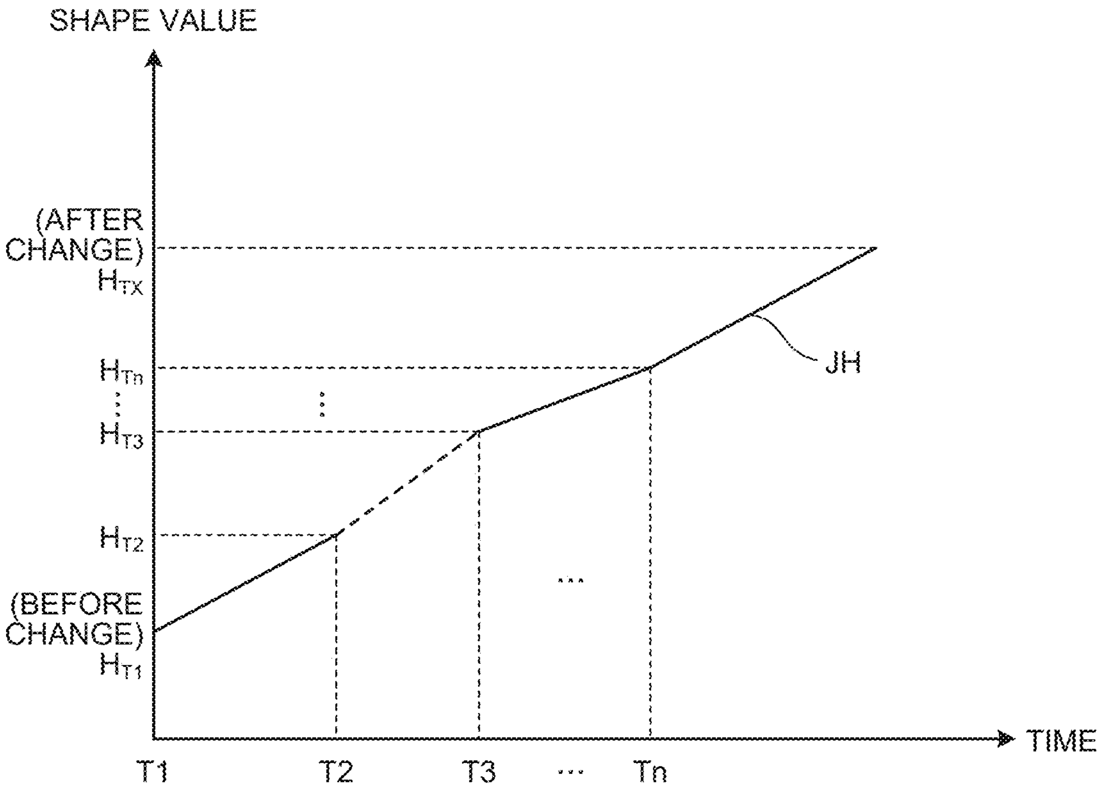
FIG. 17 is a diagram illustrating exemplary shape change of the light distribution shape over time.

FIG. 17 is a diagram illustrating exemplary shape change of the light distribution shape over time. In FIG. 17, the horizontal axis represents time point, and the vertical axis represents a shape value. In the present example, shape change in the lateral direction (horizontal direction) will be described below.

At time point T1 before change of the light distribution shape, the lateral shape change amount adjustment value is "$H_{T1}$". The value "$H_{T1}$" is the pre-change shape value. The post-change shape value is "$H_{TX}$".

At time point T2 after shape change is started, the lateral shape change amount adjustment value is "$H_{T2}$". At time point T3, the lateral shape change amount adjustment value is "$H_{T3}$". Similarly, shape change occurs at each time point, and the lateral shape change amount adjustment value at time point Tn is "$H_{Tn}$". Solid line JH in FIG. 17 is a line connecting the shape values at the respective time points.

In a case where the shape change amount adjustment values $H_{T1}$, $H_{T2}$, $H_{T3}$, . . . , $H_{Tn}$ are equal, shape change between time points is constant, and accordingly, the gradient of solid line JH is constant from the pre-change "$H_{T1}$" to the post-change "$H_{TX}$". In a case where the shape change amount adjustment values $H_{T1}$, $H_{T2}$, $H_{T3}$, . . . , $H_{Tn}$ are not equal, the gradient of solid line JH is not constant as illustrated in FIG. 17, and accordingly, the shape value changes to the post-change "$H_{TX}$" while the gradient changes.

Although the above description is made of shape change in the lateral direction (horizontal direction), the above description also applies to shape change in the longitudinal direction (vertical direction). During shape change in the longitudinal direction, the shape change amount adjustment value changes in the order of "$V_{T1}$", "$V_{T2}$", "$V_{T3}$", . . . , "$V_{Tn}$", and the post-change shape value is "$V_{TX}$" (not illustrated).

Liquid Crystal Cell

The liquid crystal cells 1-1 to 1-4 included in the optical element part 700 will be described below with reference to FIGS. 18 to 30.

Figure 18:
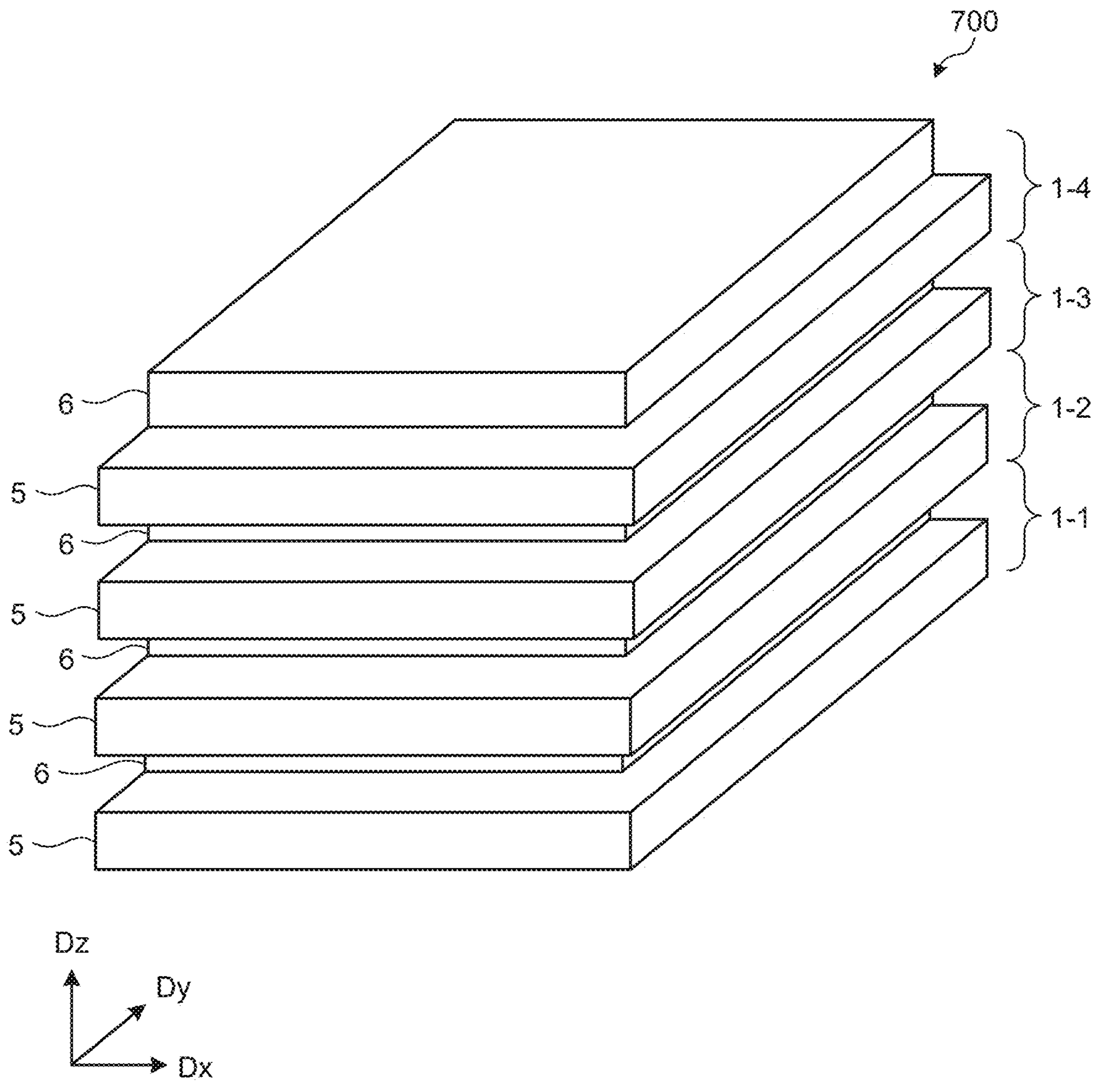
FIG. 18 is a perspective view illustrating an example of an optical element part according to an embodiment.

FIG. 18 is a perspective view illustrating an example of the optical element part 700 according to an embodiment. In FIG. 18, a Dz direction indicates the emission direction of light from the light source 800 and a non-illustrated reflector. The optical element part 700 has a configuration in which a first liquid crystal cell 1-1, a second liquid crystal cell 1-2, a third liquid crystal cell 1-3, and a fourth liquid crystal cell 1-4 are stacked in the Dz direction. In the present disclosure, the optical element part 700 has a configuration in which the first liquid crystal cell 1-1, the second liquid crystal cell 1-2, the third liquid crystal cell 1-3, and the fourth liquid crystal cell 1-4 are sequentially stacked from the light source 800 side (lower side in FIG. 18). In FIG. 18, one direction of a plane orthogonal to the Dz direction and parallel to stacking surfaces of the first liquid crystal cell 1-1, the second liquid crystal cell 1-2, the third liquid crystal cell 1-3, and the fourth liquid crystal cell 1-4 is set as a Dx direction (first direction), and a direction orthogonal to both the Dx direction and the Dz direction is set as a Dy direction (second direction).

The first liquid crystal cell 1-1, the second liquid crystal cell 1-2, the third liquid crystal cell 1-3, and the fourth liquid crystal cell 1-4 each have the same configuration. In the present disclosure, the first liquid crystal cell 1-1 and the fourth liquid crystal cell 1-4 are liquid crystal cells for p-wave polarization. The second liquid crystal cell 1-2 and the third liquid crystal cell 1-3 are liquid crystal cells for s-wave polarization. Hereinafter, the first liquid crystal cell 1-1, the second liquid crystal cell 1-2, the third liquid crystal cell 1-3, and the fourth liquid crystal cell 1-4 are also collectively referred to as "liquid crystal cells 1".

Figure 19:
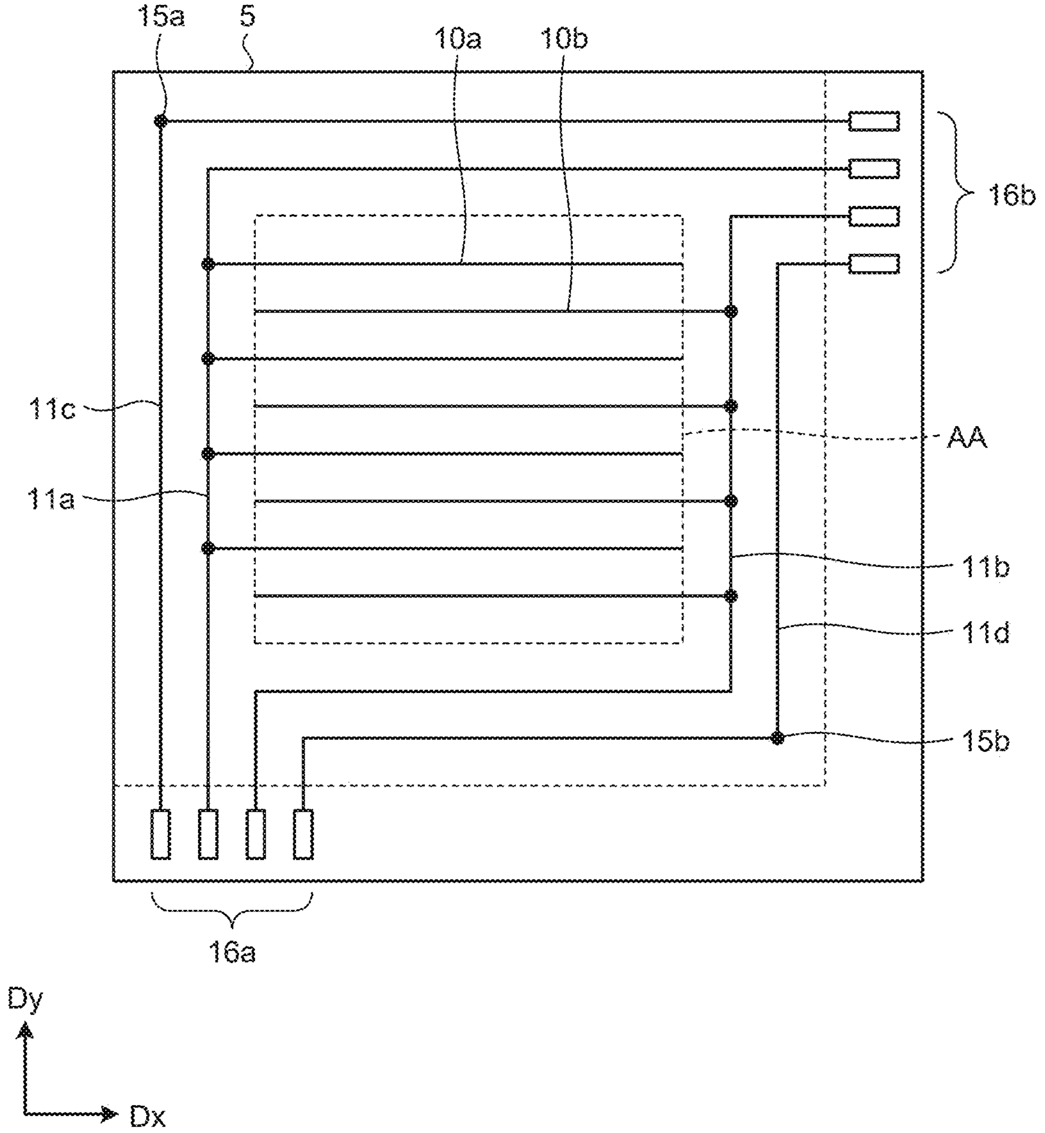
FIG. 19 is a schematic plan view of a first substrate when viewed in a Dz direction.
Figure 20:
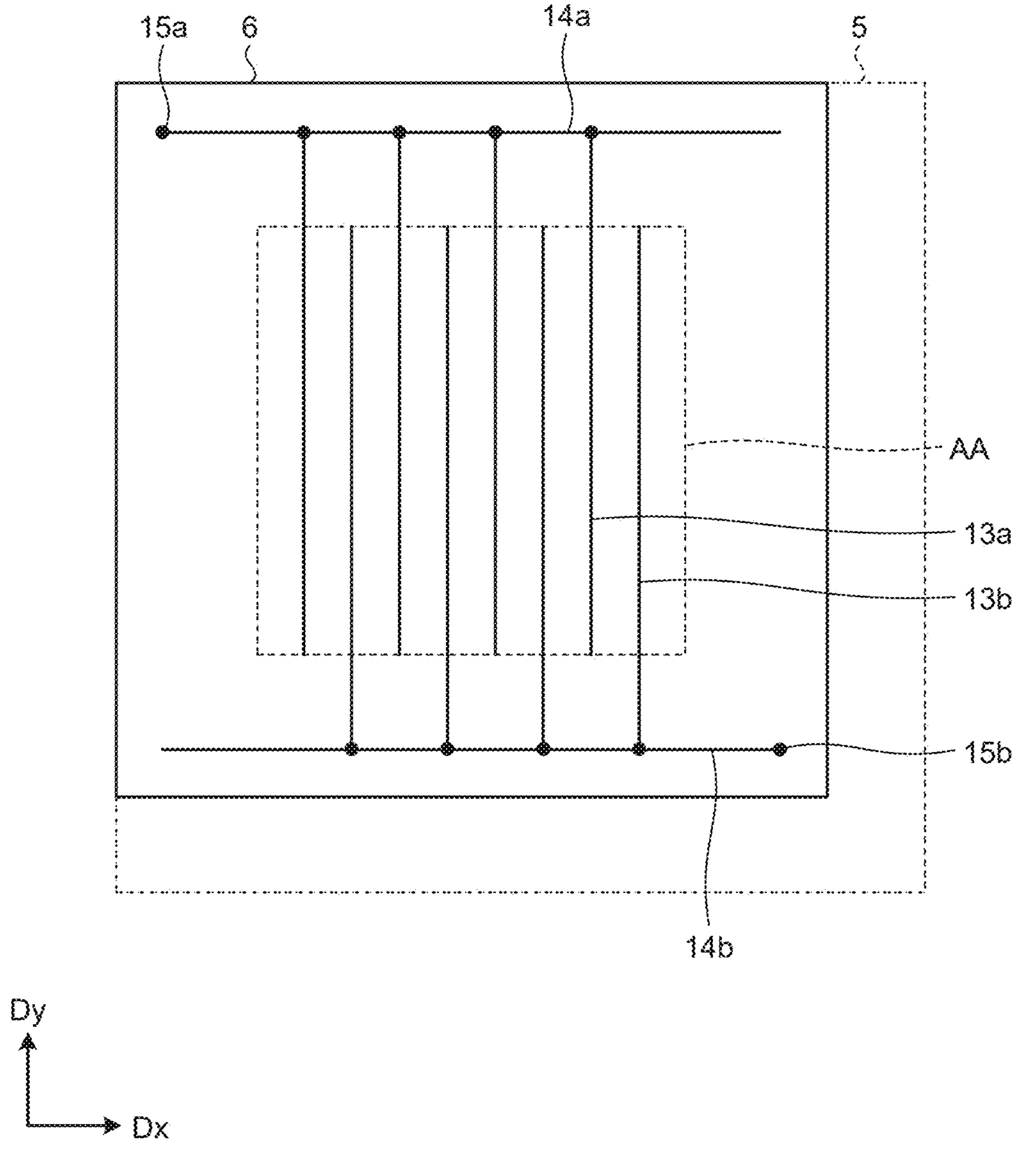
FIG. 20 is a schematic plan view of a second substrate when viewed in the Dz direction.
Figure 21:
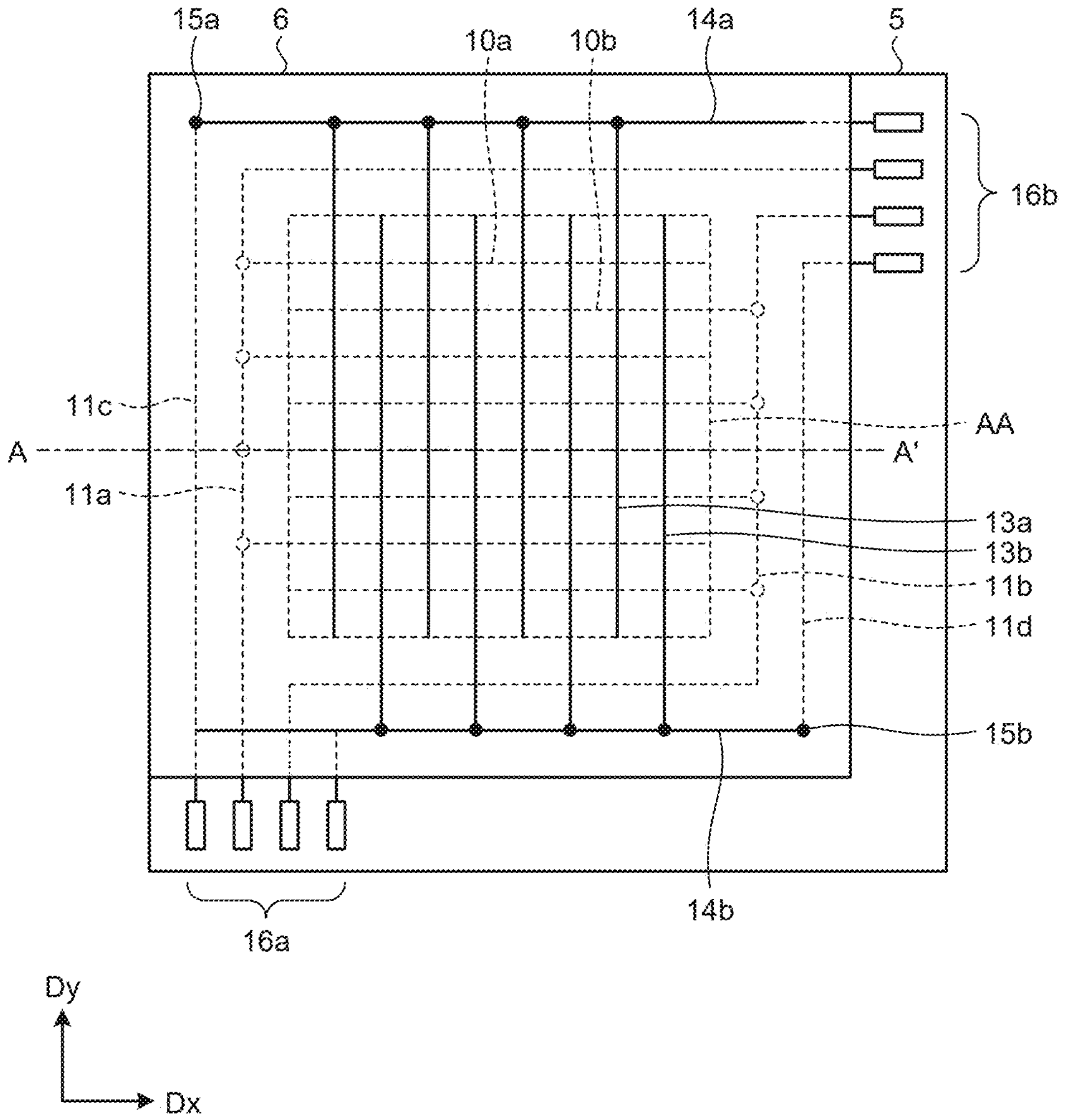
FIG. 21 is a fluoroscopic diagram of a liquid crystal cell in which the first substrate and the second substrate are placed over in the Dz direction.
Figure 22:
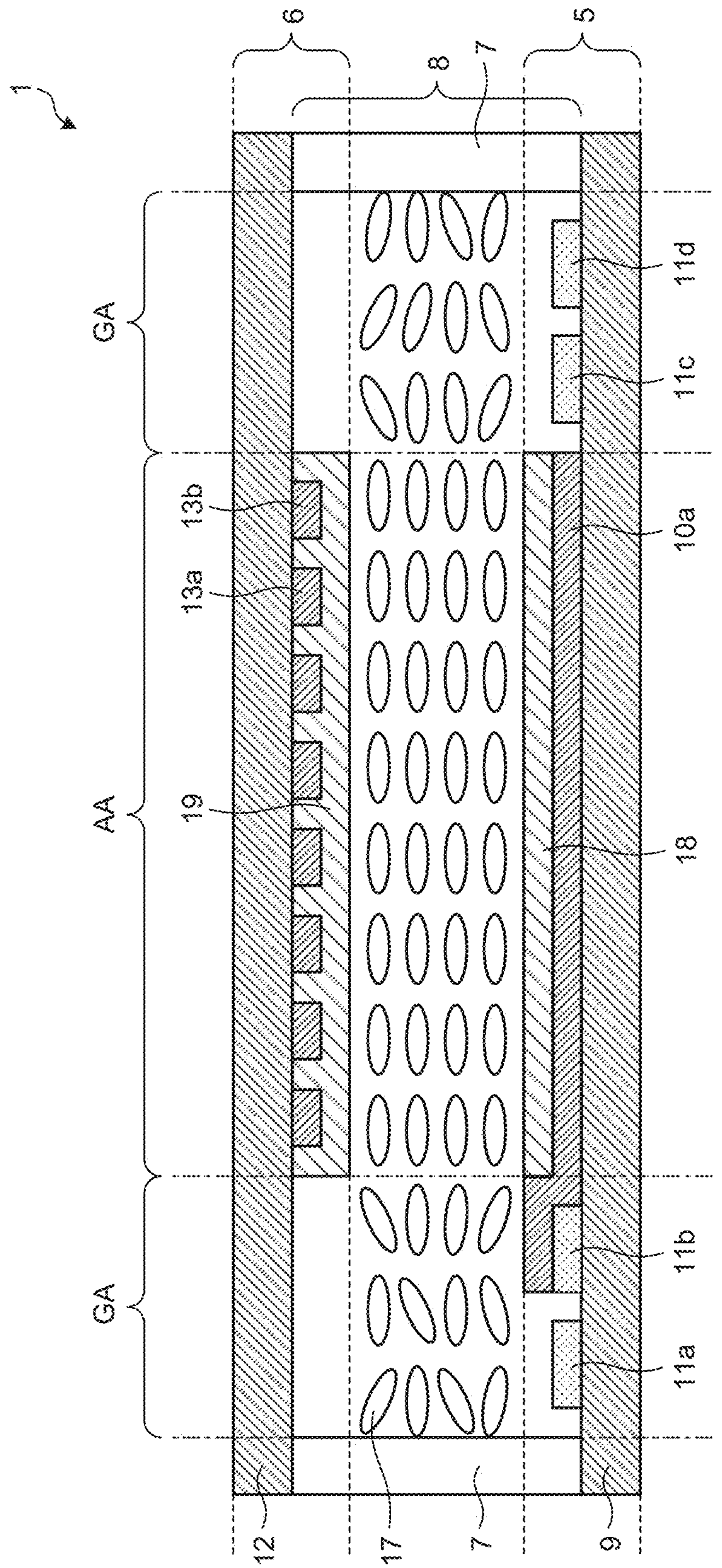
FIG. 22 is a sectional view along line A-A' illustrated in FIG. 21.

Each liquid crystal cell 1 includes a first substrate 5 and a second substrate 6. FIG. 19 is a schematic plan view of the first substrate when viewed in the Dz direction. FIG. 20 is a schematic plan view of the second substrate when viewed in the Dz direction. In FIG. 20, drive electrodes are visible through the substrates, but for clarity, drive electrodes and wirings are illustrated with solid lines. FIG. 21 is a fluoroscopic diagram of a liquid crystal cell in which the first substrate and the second substrate are placed over in the Dz direction. In FIG. 21 as well, for clarity, drive electrodes and wirings on the second substrate side are illustrated with solid lines, and drive electrodes and wirings on the first substrate side are illustrated with dotted lines. FIG. 22 is a sectional view along line A-A' illustrated in FIG. 21. FIGS. 19, 20, 21, and 22 exemplarily illustrate the third liquid crystal cell 1-3 and the fourth liquid crystal cell 1-4 in which drive electrodes 10*a* and 10*b* of the first substrate 5 extend in the Dx direction and drive electrodes 13*a* and 13*b* of the second substrate 6 extend in the Dy direction.

As illustrated in FIG. 22, the liquid crystal cell 1 includes a liquid crystal layer 8 sealed around its periphery by a sealing member 7 between the first substrate 5 and the second substrate 6.

The liquid crystal layer 8 modulates light passing through the liquid crystal layer 8 in accordance with the state of electric field. As liquid crystal molecules, positive-type nematic liquid crystals are used, but other liquid crystals with the same effects may be used.

As illustrated in FIG. 19, the drive electrodes 10*a* and 10*b*, a plurality of metal wirings 11*a* and 11*b* that supply drive voltage applied to the drive electrodes 10*a* and 10*b*, and a plurality of metal wirings 11*c* and 11*d* that supply drive voltage applied to the drive electrodes 13*a* and 13*b* (refer to FIG. 20) provided on the second substrate 6 to be described later are provided on the liquid crystal layer 8 side of a base material 9 of the first substrate 5. The metal wirings 11*a*, 11*b*, 11*c*, and 11*d* are provided in a wiring layer of the first substrate 5. The metal wirings 11*a*, 11*b*, 11*c*, and 11*d* are provided at intervals in the wiring layer on the first substrate 5. Hereinafter, the drive electrodes 10*a* and 10*b* are simply referred to as "drive electrodes 10" in some cases. In addition, the metal wirings 11*a*, 11*b*, 11*c*, and 11*d* are referred to as "first metal wirings 11" in some cases. As illustrated in FIG. 19, in the third liquid crystal cell 1-3 and the fourth liquid crystal cell 1-4, the drive electrodes 10 on the first substrate 5 extend in the Dx direction. In the first liquid crystal cell 1-1 and the second liquid crystal cell 1-2, the drive electrodes 10 on the first substrate 5 extend in the Dy direction.

As illustrated in FIG. 20, the drive electrodes 13*a* and 13*b* and a plurality of metal wirings 14*a* and 14*b* that supply drive voltage applied to these drive electrodes 13 are provided on the liquid crystal layer 8 side of a base material 12 of the second substrate 6 illustrated in FIG. 22. The metal wirings 14*a* and 14*b* are provided in a wiring layer of the second substrate 6. The metal wirings 14*a* and 14*b* are provided at intervals in the wiring layer on the second substrate 6. Hereinafter, the drive electrodes 13*a* and 13*b* are simply referred to as "drive electrodes 13" in some cases. In addition, the metal wirings 14*a* and 14*b* are referred to as "second metals wirings 14" in some cases. As illustrated in FIG. 20, in the third liquid crystal cell 1-3 the fourth liquid crystal cell 1-4, the drive electrodes 13 on the second substrate 6 extend in the Dy direction. In the first liquid crystal cell 1-1 and the second liquid crystal cell 1-2, the drive electrodes 13 on the second substrate 6 extend in the Dx direction.

The drive electrodes 10 and 13 are light-transmitting electrodes formed of a light-transmitting conductive material (light-transmitting conductive oxide) such as indium tin oxide (ITO). The first substrate 5 and the second substrate 6 are light-transmitting substrates of glass, resin, or the like. The first metal wirings 11 and the second metal wirings 14 are formed of at least one metallic material among aluminum (Al), copper (Cu), silver (Ag), molybdenum (Mo), and alloy thereof. The first metal wirings 11 and the second metal wirings 14 may each be formed of one or more of these metallic materials as a multilayered body of a plurality of layers. The at least one metallic material among aluminum (Al), copper (Cu), silver (Ag), molybdenum (Mo), and alloy thereof has a resistance lower than that of light-transmitting conductive oxide such as ITO.

The metal wiring 11*c* of the first substrate 5 and the metal wiring 14*a* of the second substrate 6 are coupled by a conduction part 15*a* made of, for example, conductive paste. The metal wiring 11*d* of the first substrate 5 and the metal wiring 14*b* of the second substrate 6 are coupled by a conduction part 15*b* made of, for example, conductive paste.

Coupling (Flex-on-Board) terminal parts 16*a* and 16*b* coupled to non-illustrated flexible printed circuits (FPC) are provided in a region on the first substrate 5, which does not overlap the second substrate 6 in the Dz direction. The coupling terminal parts 16*a* and 16*b* each include four coupling terminals corresponding to the metal wirings 11*a*, 11*b*, 11*c*, and 11*d*.

The coupling terminal parts 16*a* and 16*b* are provided in the wiring layer of the first substrate 5. Drive voltage to be applied to the drive electrodes 10*a* and 10*b* on the first substrate 5 and the drive electrodes 13*a* and 13*b* on the second substrate 6 is supplied to the liquid crystal cell 1 from an FPC coupled to the coupling terminal part 16*a* or the coupling terminal part 16*b*. Hereinafter, the coupling terminal parts 16*a* and 16*b* are simply referred to as "coupling terminal parts 16" in some cases.

As illustrated in FIG. 21, in the liquid crystal cell 1, the first substrate 5 and the second substrate 6 overlap in the Dz direction (irradiation direction of light), and the drive electrodes 10 on the first substrate 5 intersect the drive electrodes 13 on the second substrate 6 when viewed in the Dz direction. In the liquid crystal cell 1 thus configured, the alignment direction of liquid crystal molecules 17 in the liquid crystal layer 8 can be controlled by supplying drive voltage to the drive electrodes 10 on the first substrate 5 and the drive electrodes 13 on the second substrate 6. A region in which the alignment direction of the liquid crystal molecules 17 in the liquid crystal layer 8 can be controlled is referred to as an "effective region AA". The diffusion degree of light transmitting through the effective region AA of the liquid crystal cell 1 can be controlled as refractive index distribution of the liquid crystal layer 8 changes in the effective region AA. A region outside the effective region AA, where the liquid crystal layer 8 is sealed by the sealing member 7 is referred to as a "peripheral region GA" (refer to FIG. 22).

As illustrated in FIG. 22, the drive electrodes 10 (in FIG. 22, the drive electrode 10*a*) in the effective region AA of the first substrate 5 are covered by an alignment film 18. The drive electrodes 13 (in FIG. 22, the drive electrodes 13*a* and 13*b*) in the effective region AA of the second substrate 6 are covered by an alignment film 19. The alignment direction of the liquid crystal molecules is different between the alignment film 18 and the alignment film 19.

Figure 23:
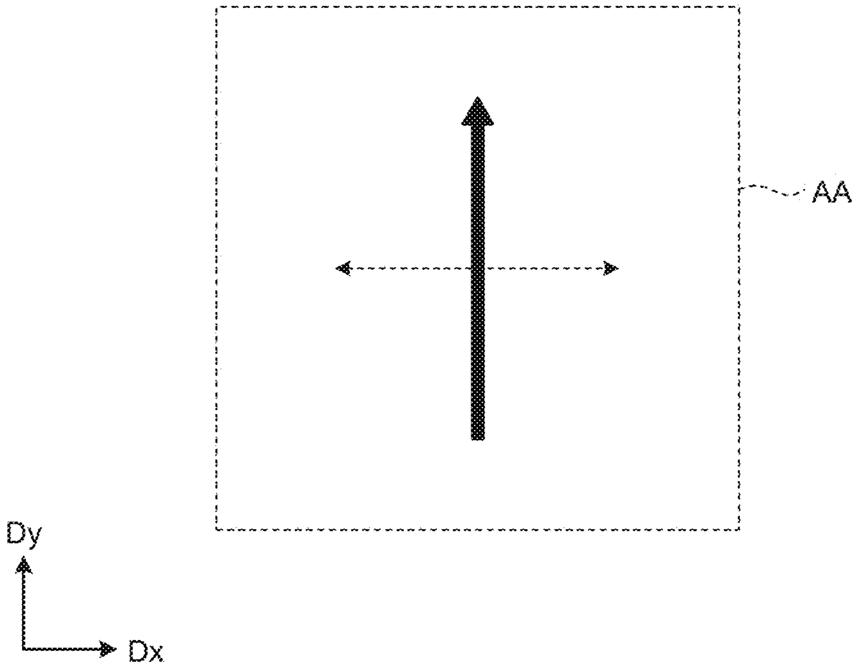
FIG. 23 is a diagram illustrating the alignment direction of an alignment film of the first substrate.
Figure 24:
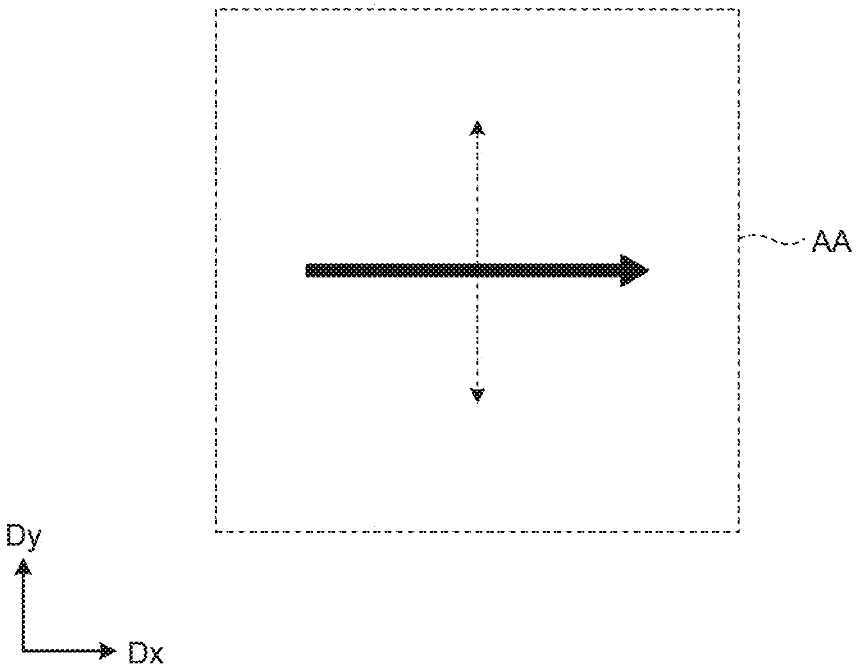
FIG. 24 is a diagram illustrating the alignment direction of an alignment film of the second substrate.

FIG. 23 is a diagram illustrating the alignment direction of the alignment film of the first substrate. FIG. 24 is a diagram illustrating the alignment direction of the alignment film of the second substrate.

As illustrated in FIGS. 23 and 24, the alignment direction of the alignment film 18 of the first substrate 5 and the alignment direction of the alignment film 19 of the second substrate 6 are directions intersecting each other in a plan view. Specifically, as illustrated with a solid arrow in FIG. 23, the alignment direction of the alignment film 18 of the first substrate 5 is orthogonal to the extending direction of the drive electrodes 10*a* and 10*b*, which is illustrated with a dashed arrow in FIG. 23. As illustrated with a solid arrow in FIG. 24, the alignment direction of the alignment film 19 of the second substrate 6 is orthogonal to the extending direction of the drive electrodes 13*a* and 13*b*, which is illustrated with a dashed arrow in FIG. 24. In the following description, the extending directions of the drive electrodes 10 and 13 are orthogonal to the alignment directions of the alignment films 18 and 19 covering them, but these may intersect at an angle other than orthogonal, for example, in the angle range of 85° to 90°. The drive electrodes 10 on the first substrate 5 side and the drive electrodes 13 on the second substrate 6 side are preferably orthogonal to each other but may intersect, for example, in the angle range of 85° to 90°. The alignment directions of the alignment films 18 and 19 are formed by rubbing processing or light alignment processing.

Figure 25:
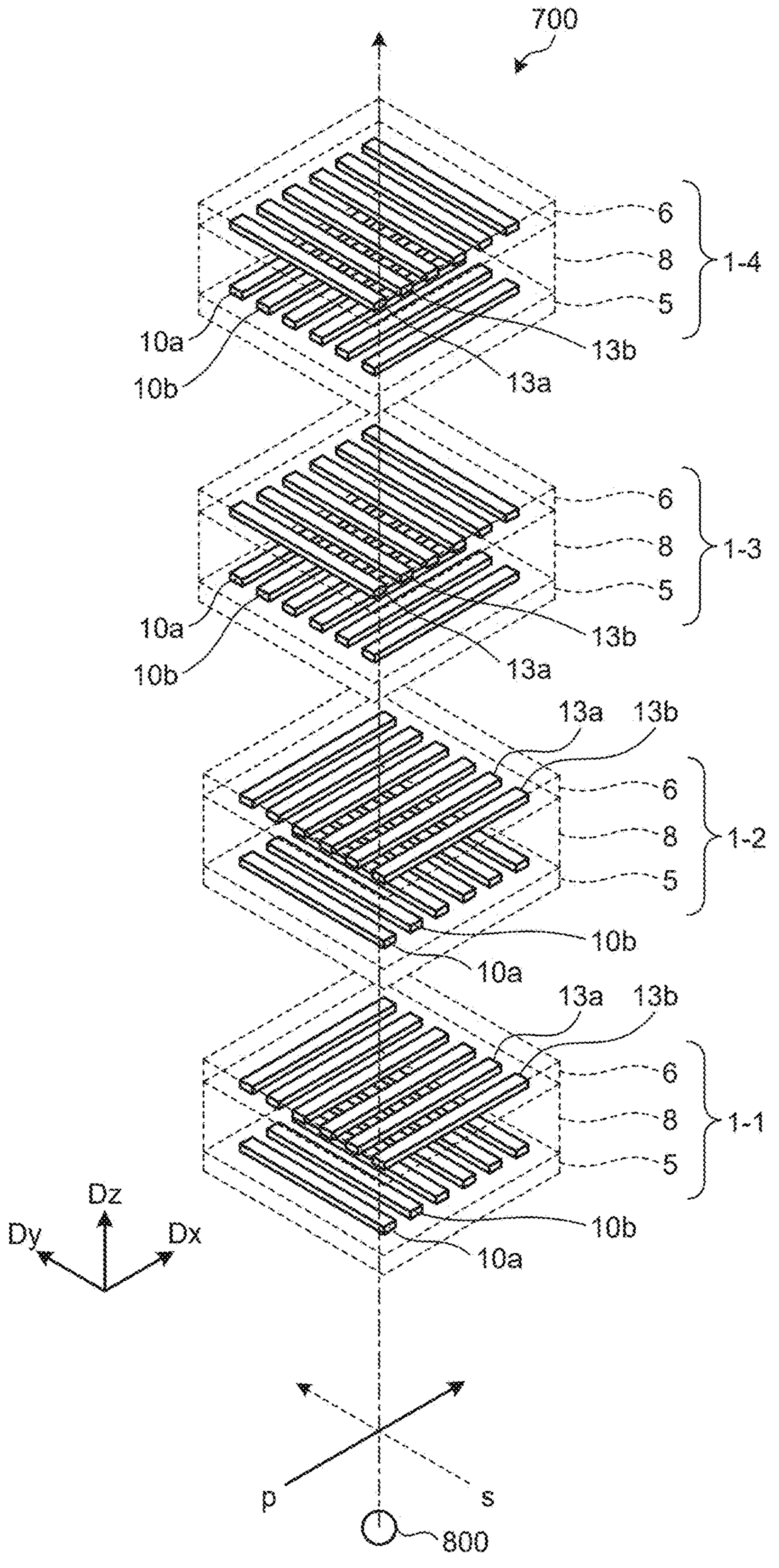
FIG. 25 is a multilayered structure diagram of an optical element according to the embodiment.

A mechanism for changing the shape of light by using the liquid crystal cells 1 (the first liquid crystal cell 1-1, the second liquid crystal cell 1-2, the third liquid crystal cell 1-3, and the fourth liquid crystal cell 1-4) will be described below. FIG. 25 is a multilayered structure diagram of the optical element according to the embodiment. FIGS. 26, 27, 28, and 29 are conceptual diagrams for description of light shape change through the optical element according to the embodiment. FIGS. 26, 27, 28, and 29 illustrate examples in which potential difference is generated between the drive electrodes of hatched substrates of the liquid crystal cells 1.

As illustrated in FIG. 25, the optical element part 700 is provided on the optical axis of the light source 800, which is illustrated with a dashed and single-dotted line, and as described above, the first liquid crystal cell 1-1, the second liquid crystal cell 1-2, the third liquid crystal cell 1-3, the fourth liquid crystal cell 1-4 are sequentially stacked from the light source 800 side (lower side in FIG. 25). The third liquid crystal cell 1-3 and the fourth liquid crystal cell 1-4 are stacked in a state of being rotated by 90° relative to the first liquid crystal cell 1-1 and the second liquid crystal cell 1-2

In each liquid crystal cell 1, the alignment directions of the alignment films on the first substrate 5 side and the second substrate 6 side intersect each other as illustrated in FIGS. 23 and 24. Accordingly, the orientation of the liquid crystal molecules in the liquid crystal layer 8 gradually changes from the Dx direction to the Dy direction (or from the Dy direction to the Dx direction) as the position moves from the first substrate 5 side toward the second substrate 6 side, and the polarized light component of transmitted light rotates along with the change. Specifically, in the liquid crystal cell 1, the polarized light component, which was a p-polarized component on the first substrate 5 side, changes to an s-polarized light component as the position moves toward the second substrate 6 side, and the polarized light component, which was an s-polarized light component on the first substrate 5 side, changes to a p-polarized component as the position moves toward the second substrate 6 side. This rotation of the polarized light component may be referred to as optical rotation.

Figure 26:
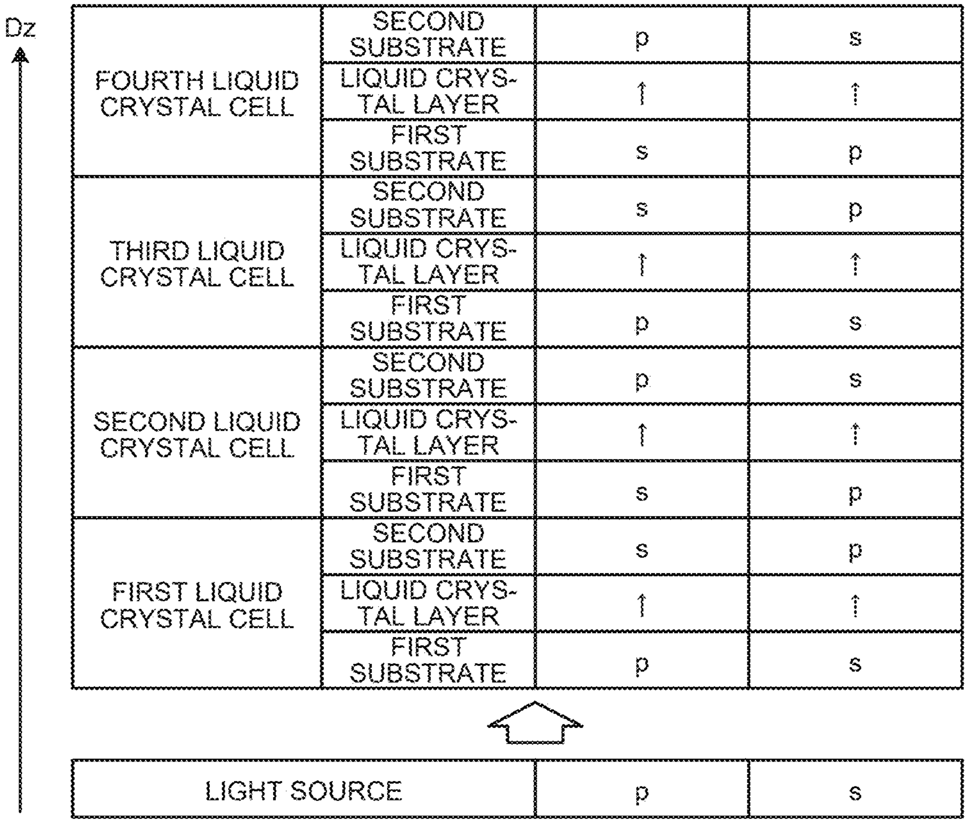
FIG. 26 is a conceptual diagram for description of light shape change through the optical element according to the embodiment.

FIG. 26 illustrates a state in which no potential is generated between adjacent electrodes in each liquid crystal cell 1. In this case, only optical rotation occurs in each liquid crystal cell 1 and no polarized light component is diffused.

Figure 27:
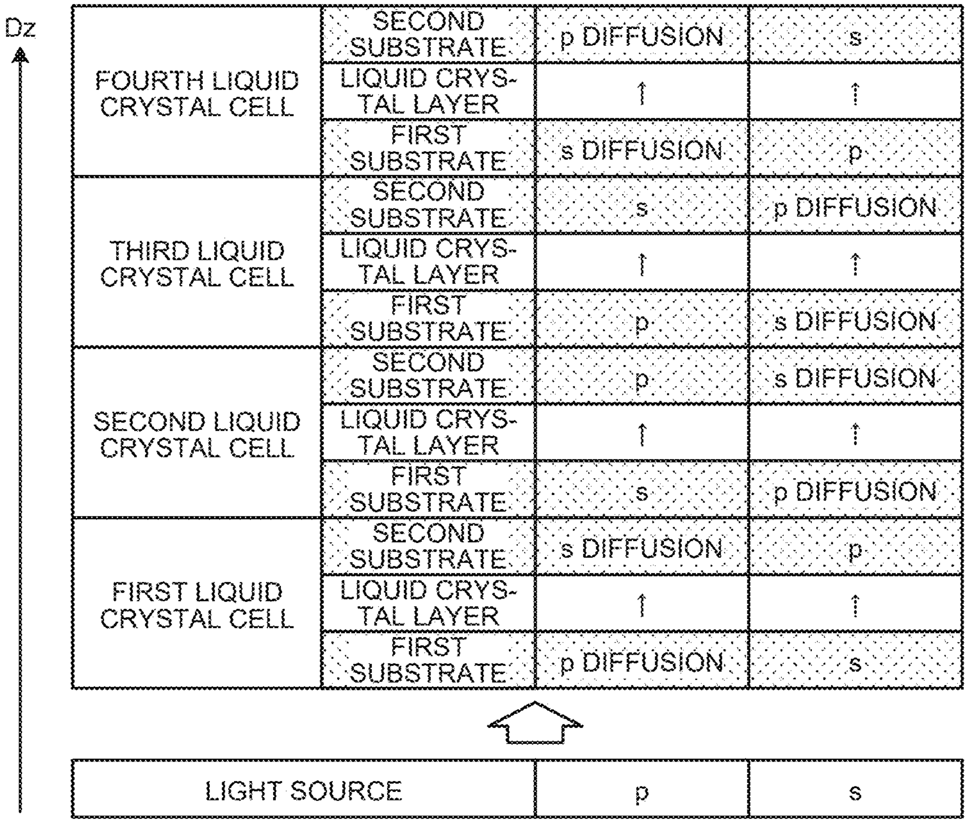
FIG. 27 is a conceptual diagram for description of light shape change through the optical element according to the embodiment.

As illustrated in FIG. 27, for example, when potential difference is generated between the drive electrodes 10*a* and 10*b* on the first substrate 5 side in the first liquid crystal cell 1-1, the liquid crystal molecules between the electrodes are aligned in a circular arc shape, and accordingly, refractive index distribution is formed in the Dx direction in the liquid crystal layer 8. As light from the light source 800 passes through in this state, the above-described refractive index distribution acts on the polarized light component (in FIG. 27, p-polarized component) parallel to the Dx direction, and accordingly, the p-polarized component diffuses in the Dx direction.

In addition, when potential difference is generated between the drive electrodes 13*a* and 13*b* on the second substrate 6 side in the first liquid crystal cell 1-1, refractive index distribution is formed in the Dy direction on the second substrate 6 side, and accordingly, the s-polarized light component diffuses in the Dy direction on the second substrate 6 side. Specifically, the polarized light component having changed from a p-polarized component to an s-polarized light component during passing through the liquid crystal layer 8 in the first liquid crystal cell 1-1 diffuses in the Dy direction as well. However, the s-polarized light component at incidence on the first liquid crystal cell 1-1 optically rotates during passing through the liquid crystal layer 8 but intersects each refractive index distribution, and accordingly, only optically rotates without diffusing and passes through the first liquid crystal cell 1-1.

The s-polarized light component at incidence on the first liquid crystal cell 1-1 changes to a p-polarized component after passing through the first liquid crystal cell 1-1, and the second liquid crystal cell 1-2 acts on this p-polarized component. Specifically, as illustrated in FIGS. 26 and 27, the first liquid crystal cell 1-1 acts on the p-polarized component among light incident on the optical element part 700, and the second liquid crystal cell 1-2 acts on the s-polarized light component. Since the third liquid crystal cell 1-3 and the fourth liquid crystal cell 1-4 are provided with rotation by 90° relative to the first liquid crystal cell 1-1 and the second liquid crystal cell 1-2, polarized light components on which they act are switched by 90°. Specifically, the third liquid crystal cell 1-3 acts on the s-polarized light component at incidence on the optical element part 700, and the fourth liquid crystal cell 1-4 acts on the p-polarized component at incidence on the optical element part 700.

Figure 28:
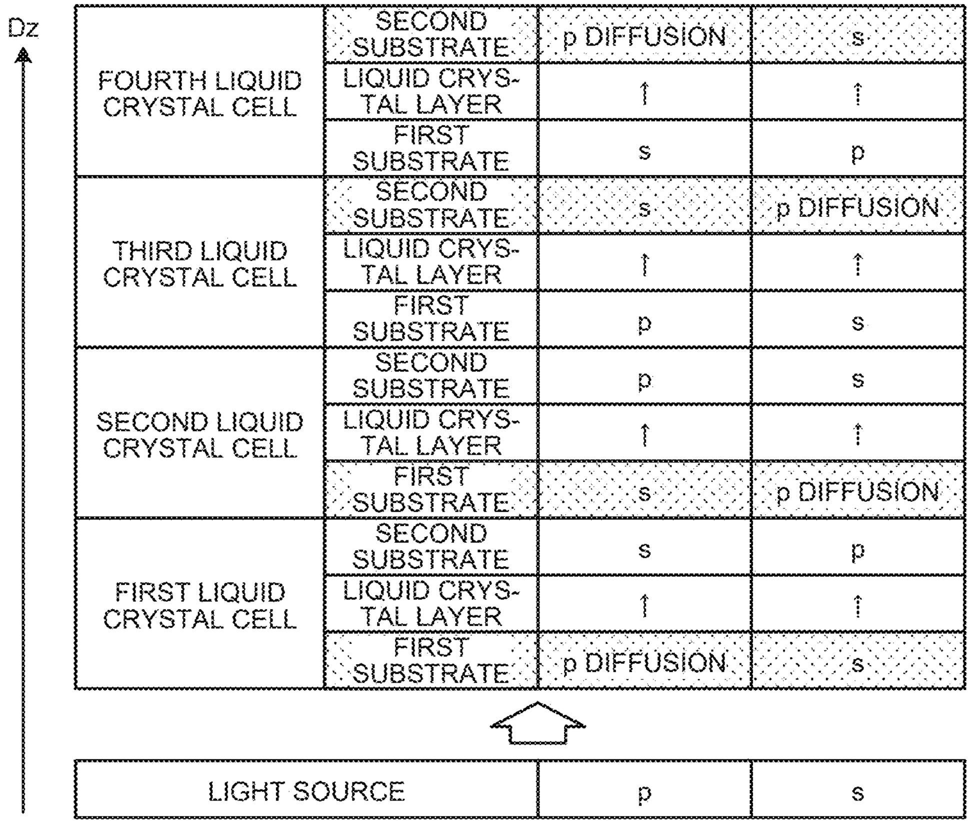
FIG. 28 is a conceptual diagram for description of light shape change through the optical element according to the embodiment.

As illustrated in FIG. 28, in the optical element, it is possible to act on the p-polarized component by providing potential difference between drive electrodes extending in the Dy direction in each liquid crystal cell 1 (between the drive electrodes 10*a* and 10*b* of the first substrate 5 in the first liquid crystal cell 1-1 and the second liquid crystal cell 1-2 and between the drive electrodes 13*a* and 13*b* of the second substrate 6 in the third liquid crystal cell 1-3 and the fourth liquid crystal cell 1-4), thereby increasing the shape of light mainly in the Dx direction. This effect may be referred to as horizontal diffusion.

As illustrated in FIG. 29, it is possible to act on the s-polarized light component by providing potential difference between drive electrodes extending in the Dx direction in each liquid crystal cell 1 (between the drive electrodes 13*a* and 13*b* of the second substrate 6 in the first liquid crystal cell 1-1 and the second liquid crystal cell 1-2 and between the drive electrodes 10*a* and 10*b* of the first substrate 5 in the third liquid crystal cell 1-3 and the fourth liquid crystal cell 1-4), thereby increasing the shape of light mainly in the Dy direction. This effect may be referred to as vertical diffusion.

The diffusion degree of light in each direction depends on the potential difference between the drive electrodes 10*a* and 10*b* (or between the drive electrodes 13*a* and 13*b*) adjacent to each other. The spread of light in the direction is maximum (100(%)) in a case where the potential difference between the drive electrodes 10*a* and 10*b* (or between the drive electrodes 13*a* and 13*b*) is maximum potential difference (for example, 30 (V)) defined in advance, and no spread of light (0(%)) occurs in the direction in a case where no potential difference is generated. Alternatively, the spread of light in the direction is 50(%) in a case where the potential difference between the drive electrodes 10*a* and 10*b* (or between the drive electrodes 13*a* and 13*b*) is 50(%) (for example, 15 (V)) of the above-described maximum potential difference. Note that, in a case where the relation between voltage difference and light spread is not linear, it is possible to set another potential difference instead of 15 (V).

In each liquid crystal cell 1, the interval (is also referred to as a cell gap) between its substrates (between the first substrate 5 and the second substrate 6) is large at 30 μm to 50 μm approximately, and accordingly, influence of an electric field formed in one of the substrates on the other substrate side is suppressed as much as possible. It goes without saying that drive voltage that generates potential difference between the drive electrodes 10*a* and 10*b* (or between the drive electrodes 13*a* and 13*b*) adjacent to each other is what is called alternating-current square wave, thereby preventing burn-in of the liquid crystal molecules.

The alignment directions of the alignment films, the extending directions of the drive electrodes on the substrates, and the angle between them may be modified as appropriate for the entire optical element part 700 or each liquid crystal cell 1 in accordance with the characteristics of liquid crystals to be employed and optical specifications to be intentionally obtained.

In the present embodiment, description is made on the configuration of the optical element part 700 in which the four liquid crystal cells of the first liquid crystal cell 1-1, the second liquid crystal cell 1-2, the third liquid crystal cell 1-3, and the fourth liquid crystal cell 1-4 are stacked, but the optical element part 700 is not limited to this configuration and may employ, for example, a configuration in which two or three liquid crystal cells 1 are stacked or a configuration in which a plurality of liquid crystal cells 1, five or more liquid crystal cells 1, are stacked.

In the present disclosure, in the illumination device 100 with the above-described configuration, light incident on the optical element from the light source 800 is controlled in the two directions of the Dx direction (direction of horizontal diffusion) and the Dy direction (direction of vertical diffusion) by controlling drive voltage of each liquid crystal cell 1. The above-described vertical diffusion and horizontal diffusion may be collectively referred to as light diffusion. Accordingly, the shape of light emitted from the optical element is changed. The shape of light is a light shape that appears on a plane parallel to an emission surface of the optical element, and this may be referred to as a light distribution shape. Hereinafter, control of the light diffusion degree in the present disclosure will be described below with reference to FIG. 30.

Figure 30:
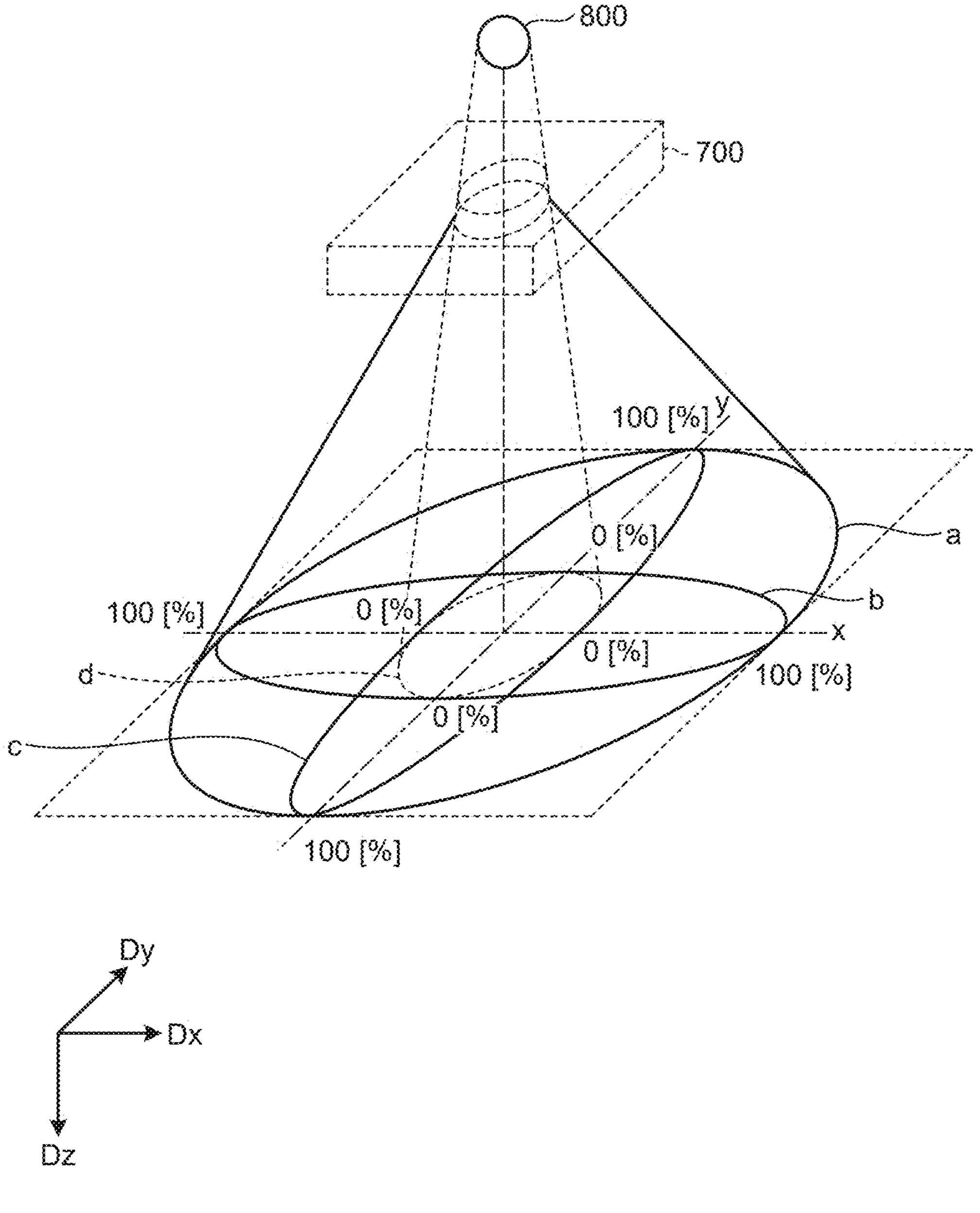
FIG. 30 is a conceptual diagram for conceptually describing light distribution control by the illumination device according to the embodiment.

FIG. 30 is a conceptual diagram for conceptually describing control of the light diffusion degree of the illumination device according to the embodiment. The diagram illustrates an irradiation area of light on a virtual plane xy orthogonal to the Dz direction. The outline of the actual irradiation area is slightly unclear depending on the distance from the light source 800, a light diffraction phenomenon, and the like.

As described above, the alignment direction of the liquid crystal molecules 17 in the liquid crystal layer 8 is controlled as drive voltage is supplied to the drive electrodes 10 and 13 of each liquid crystal cell 1 of the optical element part 700 provided on the optical axis of the light source 800. Accordingly, the light distribution shape of light emitted from the optical element part 700 is controlled.

Specifically, for example, the light distribution shape in the Dx direction changes in accordance with drive voltage applied to the drive electrodes 10 or drive electrodes 13 extending in the Dy direction in each liquid crystal cell 1 as described above. Such light diffusion in the Dx direction may be referred to as the horizontal diffusion. The light distribution shape in the Dy direction changes in accordance with drive voltage applied to the drive electrodes 10 or drive electrodes 13 extending in the Dx direction in the first to fourth liquid crystal cells. Such light diffusion in the Dy direction may be referred to as the vertical diffusion.

As described above, in the present disclosure, the minimum diffusion degrees of the horizontal diffusion and the vertical diffusion are 0 and the maximum diffusion degrees thereof are 255. More specifically, in a case where the horizontal diffusion degree is 0, drive electrodes (for example, the drive electrodes 10 extending in the Dy direction on the first substrate 5 in the first liquid crystal cell 1-1) functioning to expand the light distribution state in the Dx direction do not act on the refractive index distribution of the liquid crystal layer 8. In this case, no potential difference is present between the adjacent drive electrodes 10*a* and 10*b* or no potential is supplied to the electrodes. On the other hand, in a case where the horizontal diffusion degree is 255, drive electrodes (for example, the drive electrodes 10 extending in the Dy direction on the first substrate 5 in the first liquid crystal cell 1-1) functioning to expand the light distribution state in the Dx direction maximumly act on the refractive index distribution of the liquid crystal layer 8. In this case, the potential difference between the adjacent drive electrodes 10*a* and 10*b* is set to the maximum potential difference (for example, 30 (V)) in the optical element part 700. In a case where the horizontal diffusion degree is larger than 0 and smaller than 255, potential for which the potential difference between the adjacent drive electrodes 10*a* and 10*b* is adjusted to be larger than 0 (V) and smaller than the maximum potential difference (for example, 30 (V)) is applied to the electrodes. The same applies to the vertical diffusion.

Outline "a" illustrated in FIG. 30 exemplarily indicates the irradiation area in a case where the horizontal diffusion degree and the vertical diffusion degree are both 100(%). Outline "b" illustrated in FIG. 30 exemplarily indicates the irradiation area in a case where the horizontal diffusion degree is 100(%) and the vertical diffusion degree is 0(%). Outline "c" illustrated in FIG. 30 exemplarily indicates the irradiation area in a case where the horizontal diffusion degree is 0(%) and the vertical diffusion degree is 100(%). Outline "d" illustrated in FIG. 30 exemplarily indicates the irradiation area in a case where the horizontal diffusion degree and the vertical diffusion degree are both 0(%). In other words, outline "d" indicates the light distribution state when light from the light source 800 is emitted without being controlled by the optical element part 700 (or simply transmitting through the optical element part 700).

In this manner, in the illumination device 100 with the above-described configuration, it is possible to control the horizontal and vertical diffusion degrees of emission light from the optical element part 700 by performing drive voltage control of each liquid crystal cell 1. Accordingly, it is possible to change the light distribution shape of emission light from the illumination device 100. Hereinafter, control that changes the light distribution shape of emission light from the illumination device 100 is also referred to as "light distribution control".

Note that the illumination device 100 capable of light distribution control in the two directions of the Dx and Dy directions is exemplarily described in the present disclosure, but controllable parameters of the illumination device 100 is not limited to light distribution (light spread). For example, the illumination device 100 may be capable of light adjustment control. In this case, controllable parameters of the illumination device 100 may include light adjustment (brightness).

Figure 31:
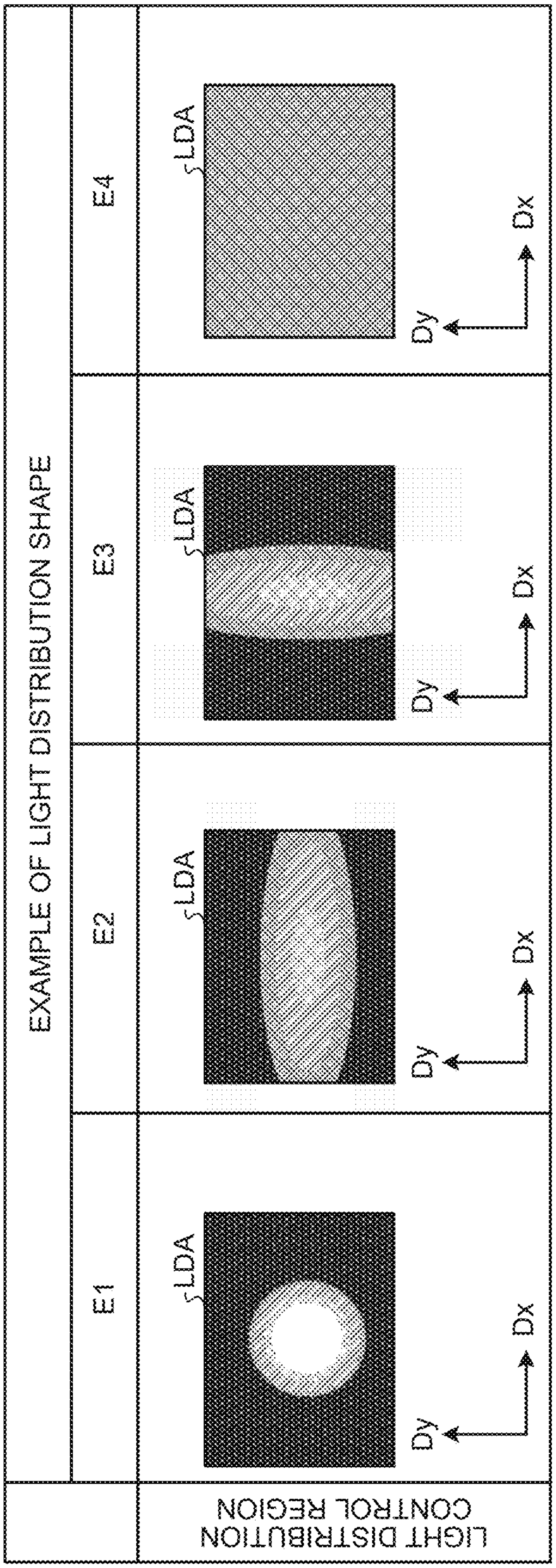
FIG. 31 is a schematic diagram illustrating an example of light distribution control by a light distribution control region.

FIG. 31 is a schematic diagram illustrating an example of light distribution control by a light distribution control region LDA. The light distribution control region LDA is a region in which the plurality of drive electrodes 10 and the plurality of drive electrodes 13 are disposed in plan view. In other words, the light distribution control region LDA includes a plurality of electrodes extending in the Dx direction and arranged in the Dy direction and a plurality of electrodes extending in the Dy direction and arranged in the Dx direction. The electrodes extending in the Dx direction and arranged in the Dy direction are, for example, the drive electrodes 10. The electrodes extending in the Dy direction and arranged in the Dx direction are, for example, the drive electrodes 13.

Since the optical element part 700 includes the four liquid crystal cells 1-1 to 1-4 overlapping each other in the Dz direction, the electrodes extending in the Dx direction and arranged in the Dy direction and the electrodes extending in the Dy direction and arranged in the Dx direction are quadruplicated in the Dy direction. The light distribution control region LDA can control the transmission range and transmission degree of light traveling from one surface side of the optical element part 700 toward the other surface side as in Examples E1, E2, E3, and E4 as "exemplary light distribution shape" exemplarily illustrated in FIG. 31 by controlling the potential of each of the electrodes extending in the Dx direction and arranged in the Dy direction and the electrodes extending in the Dy direction and arranged in the Dx direction of the four liquid crystal cells 1-1 to 1-4 included in the optical element part 700.

Example E1 in FIG. 31 is a schematic diagram illustrating the state of the light distribution control region LDA when viewed in plan view from a side opposite a light source (for example, the light source 800) in a case where the potential difference between adjacent electrodes among the electrodes extending in the Dx direction and arranged in the Dy direction and the electrodes extending in the Dy direction and arranged in the Dx direction is all 0 volt (V). In Example E1, light from the light source transmits through the light distribution control region LDA with almost no change.

Example E2 is a schematic diagram illustrating the state of the light distribution control region LDA when viewed in plan view from a side opposite a light source (for example, the light source 800) in a case where the potential difference between adjacent electrodes among the electrodes extending in the Dx direction and arranged in the Dy direction is 0 volt (V) and the potential difference between adjacent electrodes among the electrodes extending in the Dy direction and arranged in the Dx direction exceeds 0 volt (V). Example E2 illustrates the state of the light distribution control region LDA when controlling light distribution so that, when light spread in the Dx direction and light spread in the Dy direction are compared, light from the light source relatively largely spreads in the Dx direction but does not much spread in the Dy direction. In this manner, by setting the potential difference between adjacent electrodes among the electrodes extending in the Dy direction and arranged in the Dx direction to be larger than the potential difference between adjacent electrodes among the electrodes extending in the Dx direction and arranged in the Dy direction, it is possible to set diffusion in the Dx direction (lateral diffusion) to be larger than diffusion in the Dy direction (longitudinal diffusion).

Example E3 is a schematic diagram illustrating the state of the light distribution control region LDA when viewed in plan view from a side opposite a light source (for example, the light source 800) in a case where the potential difference between adjacent electrodes among the electrodes extending in the Dx direction and arranged in the Dy direction exceeds 0 volt (V) and the potential difference between a plurality of adjacent electrodes extending in the Dy direction and arranged in the Dx direction is 0 volt (V). Example E3 illustrates the state of the light distribution control region LDA when controlling light distribution so that, when light spread in the Dx direction and light spread in the Dy direction are compared, light from the light source relatively largely spreads in the Dy direction but does not much spread in the Dx direction. In this manner, by setting the potential difference between adjacent electrodes among the electrodes extending in the Dy direction and arranged in the Dx direction to be smaller than the potential difference between adjacent electrodes among the electrodes extending in the Dx direction and arranged in the Dy direction, it is possible to set diffusion in the Dy direction (longitudinal diffusion) to be larger than diffusion in the Dx direction (lateral diffusion).

Example E4 is a schematic diagram illustrating the state of the light distribution control region LDA when viewed in plan view from a side opposite a light source (for example, the light source 800) in a case where the potentials of the electrodes extending in the Dx direction and arranged in the Dy direction and the electrodes extending in the Dy direction and arranged in the Dx direction all exceed 0 volt (V). Example E4 illustrates the state of the light distribution control region LDA being entirely dark when viewed from a side opposite the light source with the light distribution control region LDA interposed therebetween as a result of simultaneous occurrence of lateral diffusion and longitudinal diffusion in effect.

Note that the light distribution control region LDA only needs to include, in plan view, two or more electrodes extending in the Dx direction and arranged in the Dy direction and two or more electrodes extending in the Dy direction and arranged in the Dx direction. A first condition is such that one light distribution control region LDA includes m electrodes extending in the Dx direction and arranged in the Dy direction and n electrodes extending in the Dy direction and arranged in the Dx direction. A second condition is such that the number of electrodes (for example, the drive electrodes 10) extending in the Dx direction and arranged in the Dy direction is mxp and the number of electrodes extending in the Dy direction and arranged in the Dx direction (for example, the drive electrodes 13) is nxq in each of the liquid crystal cells 1-1 to 1-4. With the first and second conditions as a premise, p light distribution control regions LDA in the Dx direction and q light distribution control regions LDA in the Dy direction can be set in a matrix (row-column configuration) in the optical element part 700. The numbers m, n, p, and q are natural numbers of two or more. Alternatively, the entire active region (region in which the liquid crystal layer is provided) included in one liquid crystal cell in plan view may be one light distribution control region LDA.

Examples E1, E2, E3, and E4 in FIG. 31 particularly illustrate shape difference in the light distribution shape in plan view by potential control. As described above with reference to FIGS. 21 and 22, the shape and size of the light transmission area can be more flexibly controlled because of the relation between potential provided to the drive electrodes 10 and potential provided to the drive electrodes 13. With this control, the shape and size of emitted light can be changed.

What is claimed is:

1. An illumination device comprising:

a light source part configured to emit light;

a light distribution shape setter configured to set a light distribution shape of light from the light source part;

a storage configured to store therein light distribution shape data related to the light distribution shape; and a controller configured to control the light distribution shape setter based on the light distribution shape data, wherein the light distribution shape setter sets the light distribution shape based on a signal level input from the controller, when changing the signal level input to the light distribution shape setter from a first level to a second level, the controller changes the signal level from the first level to a third level that is a level between the first level and the second level, and changes the signal level from the third level to the second level after maintaining the third level for a predetermined time period, the storage stores therein a shape change interval that is a time interval of shape change of the light distribution shape, and a shape change amount that is an amount of shape change of the light distribution shape, and the controller controls the light distribution shape setter based on the shape change interval and the shape change amount stored in the storage, the storage further stores therein a shape change amount adjustment value that is a value for adjusting the shape change amount, and a shape switching time point that indicates a time point of shape change of the light distribution shape, and the controller adjusts the shape change amount based on the shape change amount adjustment value stored in the storage, and changes the light distribution shape based on the shape switching time point stored in the storage.

2. The illumination device according to claim 1, wherein the shape change amount includes data of a change amount of the light distribution shape in each of a lateral direction and a longitudinal direction that are orthogonal to each other, and the controller controls the light distribution shape setter in each of the lateral direction and the longitudinal direction.

3. The illumination device according to claim 1, wherein the controller obtains a new light distribution shape by adding or subtracting the shape change amount to or from a current light distribution shape, and approaches a target light distribution shape with the light distribution shape by repeating the addition or subtraction of the shape change amount.

4. The illumination device according to claim 3, wherein the controller regards the current light distribution shape as the target light distribution shape in a case where a difference between the current light distribution shape and the target light distribution shape is smaller than the shape change amount.

5. The illumination device according to claim 1, further comprising a communicator configured to receive a signal transmitted from an external device, wherein the communicator receives the shape change amount adjustment value and the shape switching time point, and the shape change amount adjustment value and the shape switching time point received by the communicator are stored in the storage.

* * * * *